(12) United States Patent
Fukazawa et al.

(10) Patent No.: US 9,792,884 B2
(45) Date of Patent: Oct. 17, 2017

(54) IMAGE PROCESSING APPARATUS AND IMAGE PROCESSING METHOD

(71) Applicant: Kabushiki Kaisha Toshiba, Minato-ku, Tokyo (JP)

(72) Inventors: Youhei Fukazawa, Kawasaki Kanagawa (JP); Keiri Nakanishi, Kawasaki Kanagawa (JP); Masashi Jobashi, Kawasaki Kanagawa (JP); Sho Kodama, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2 days.

(21) Appl. No.: 14/988,377

(22) Filed: Jan. 5, 2016

(65) Prior Publication Data

US 2016/0267888 A1 Sep. 15, 2016

Related U.S. Application Data

(63) Continuation of application No. 14/844,953, filed on Sep. 3, 2015, now abandoned.

(30) Foreign Application Priority Data

Mar. 12, 2015 (JP) ................................. 2015-049264

(51) Int. Cl.
*G06K 9/36* (2006.01)
*G09G 5/395* (2006.01)
(Continued)

(52) U.S. Cl.
CPC ........... *G09G 5/395* (2013.01); *H04N 19/427* (2014.11); *H04N 19/44* (2014.11); *G09G 2340/02* (2013.01); *G09G 2360/12* (2013.01)

(58) Field of Classification Search
CPC .......... G09G 2340/02; G09G 2360/12; G09G 5/395; G06T 9/007; H04N 19/423;
(Continued)

(56) References Cited

U.S. PATENT DOCUMENTS 4,679,077 A * 7/1987 Yuasa .............. G08B 13/19602
340/518
5,642,135 A * 6/1997 Noguchi .............. H04N 1/3935
345/537

(Continued)

FOREIGN PATENT DOCUMENTS

JP H07-152905 A 6/1995
JP H07-152907 A 6/1995
(Continued)

*Primary Examiner* — Ali Bayat
(74) *Attorney, Agent, or Firm* — White & Case LLP

(57) ABSTRACT

According to one embodiment, an image processing apparatus includes an encoding unit that compresses an input image for each pixel block having a size smaller than a line to generate a plurality of compressed blocks, and store the compressed blocks in a frame buffer, a reading unit that identifies an object block to be expanded among the compressed blocks, and reads the object block from the frame buffer, a decoding unit that expands the object block to generate an expanded block, and an information acquiring unit that acquires, based on the expanded block, position information used by the reading unit to identify the block to be expanded, or decode information used by the decoding unit to expand another compressed block.

20 Claims, 29 Drawing Sheets

(51) Int. Cl.
*H04N 19/426* (2014.01)
*H04N 19/44* (2014.01)

(58) Field of Classification Search
CPC .. H04N 19/433; H04N 19/427; H04N 19/503;
H04N 19/44; H04N 19/61
See application file for complete search history.

(56) References Cited

U.S. PATENT DOCUMENTS

| | | | |
|---|---|---|---|
| 6,441,828 B1 * | 8/2002 | Oba | G06F 3/147 |
| | | | 345/659 |
| 8,179,397 B2 | 5/2012 | Yoshitake et al. | |
| 8,593,456 B2 * | 11/2013 | Furuhashi | A63F 13/10 |
| | | | 345/419 |
| 9,055,296 B2 * | 6/2015 | Xiang | H04N 19/61 |
| 2009/0262123 A1 | 10/2009 | Yoshitake et al. | |

FOREIGN PATENT DOCUMENTS

| | | |
|---|---|---|
| JP | H11-030969 | 2/1999 |
| JP | 2009-211026 A | 9/2009 |
| JP | 2011-077970 A | 4/2011 |

\* cited by examiner

IMAGE PROCESSING APPARATUS AND IMAGE PROCESSING METHOD

CROSS-REFERENCE TO RELATED APPLICATION

This application is a Continuation of Application Ser. No. 14/844,953, filed on Sep. 3, 2015, which is based on and claims priority to Japanese Patent Application No. 2015-049264, filed on Mar. 12, 2015. The entire disclosures of these applications are hereby incorporated into the present application by reference.

FIELD

Embodiments relate to an image processing apparatus and an image processing method.

BACKGROUND

In many image processing apparatuses, an image is first stored in a frame buffer before being output to a display. To reduce a buffer capacity, some image processing apparatuses are configured to compress an image before storing the image in the frame buffer.

A typical display is configured to scan images successively in a horizontal and forward direction (i.e., from left to right) (hereinafter the horizontal and forward direction of the display will be referred to as a "scanning direction"). To output a video signal on the display, the image processing apparatus successively expands the compressed image stored in the frame buffer in a horizontal and forward direction (hereinafter the horizontal and forward direction of the image will be referred to as a "line direction").

In recent years, more image processing apparatuses capable of outputting rotated images have been increased. A tablet terminal, for example, can display a rotated image in accordance with the rotation of the display.

In the case of the image processing apparatus that does not output the rotated image, the scanning direction of the display always matches the line direction of the display image. The image processing apparatus, therefore, can output a video signal in the scanning direction only by successively reading the image from the frame buffer along the line direction.

However, in the case of the image processing apparatus capable of outputting the rotated image, the scanning direction of the display does not match the line direction of the display image when the rotated image is output. For example, if the display image is rotated by 90 degrees, the scanning direction and the line direction become orthogonal to each other. If the display image is rotated by 180 degrees, the scanning direction is opposite to the line direction. The image processing apparatus capable of outputting the rotated image, therefore, needs to read the image stored in the frame buffer not only in the line direction but also in other directions in order to output the video signal in the scanning direction.

To allow reading in other directions, the image stored in the frame buffer may preferably be a non-compression image. However, this causes the non-compression image to be held in the frame buffer, such that the image processing apparatus needs to include a large capacity frame buffer. The large capacity frame buffer may increase product cost.

DETAILED DESCRIPTION

Figure 1:
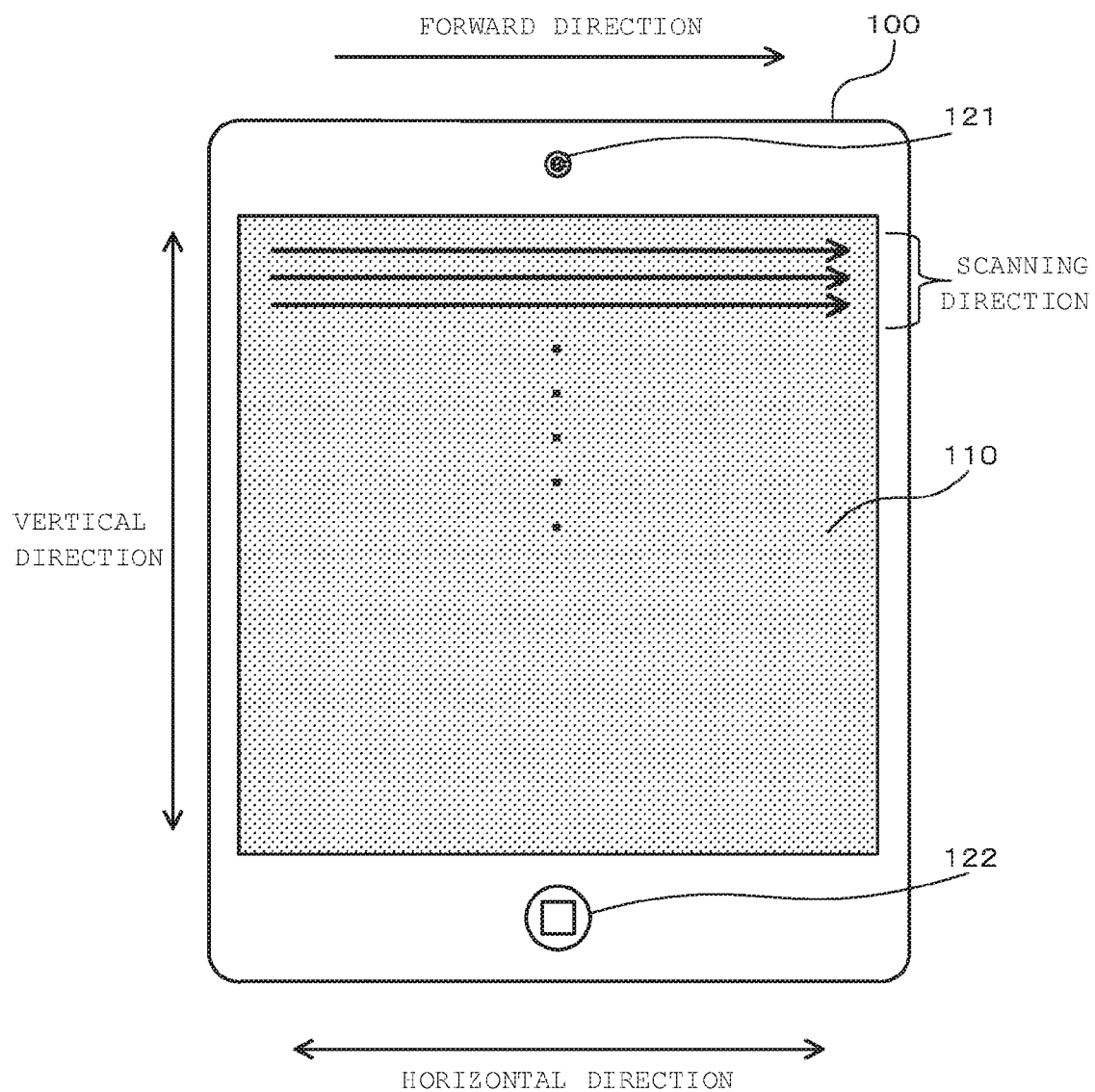
FIG. 1 illustrates the appearance of an image display apparatus according to a first embodiment.

An image processing apparatus according to embodiments includes an encoding unit configured to compress an input image for each pixel block having a size smaller than a line to generate a plurality of compressed blocks, and store the compressed blocks in a frame buffer, a reading unit configured to identify an object block to be expanded among the compressed blocks, and read the object block from the frame buffer, a decoding unit configured to expand the object block to generate an expanded block, and an information acquiring unit configured to acquire, based on the expanded block, position information used by the reading unit to identify the block to be expanded, or decode information used by the decoding unit to expand another compressed block.

Embodiments will be described below by referring to the accompanying drawings. In the drawings, the same or similar components are indicated with the same reference sings.

First Embodiment

FIG. 1 illustrates an image display apparatus 100 as an example of an image processing apparatus according to the present embodiment. The image display apparatus 100 is, for example, a tablet terminal. The image display apparatus 100 includes a display unit 110 on one surface (hereinafter referred to as a display arrangement surface). The display unit 110 is located in the center of the display arrangement surface. The image display apparatus 100 of FIG. 1 includes a camera 121 and an operation button 122. The camera 121 and the operation button 122 are located on both ends in the longitudinal direction of the display arrangement surface across the display unit 110. The camera 121 may be arranged on the rear surface. The operation button 122 may be displayed on the display unit 110.

To facilitate understanding, a state where the camera 121 is located on the upper side and the operation button 122 is located on the lower side of the image display apparatus 100 (or display unit 110) will be referred to as a normal state in the following description. However, this normal state is only an example. A person such as a designer of the apparatus may appropriately change the state to be designated as the normal state.

Figure 2:
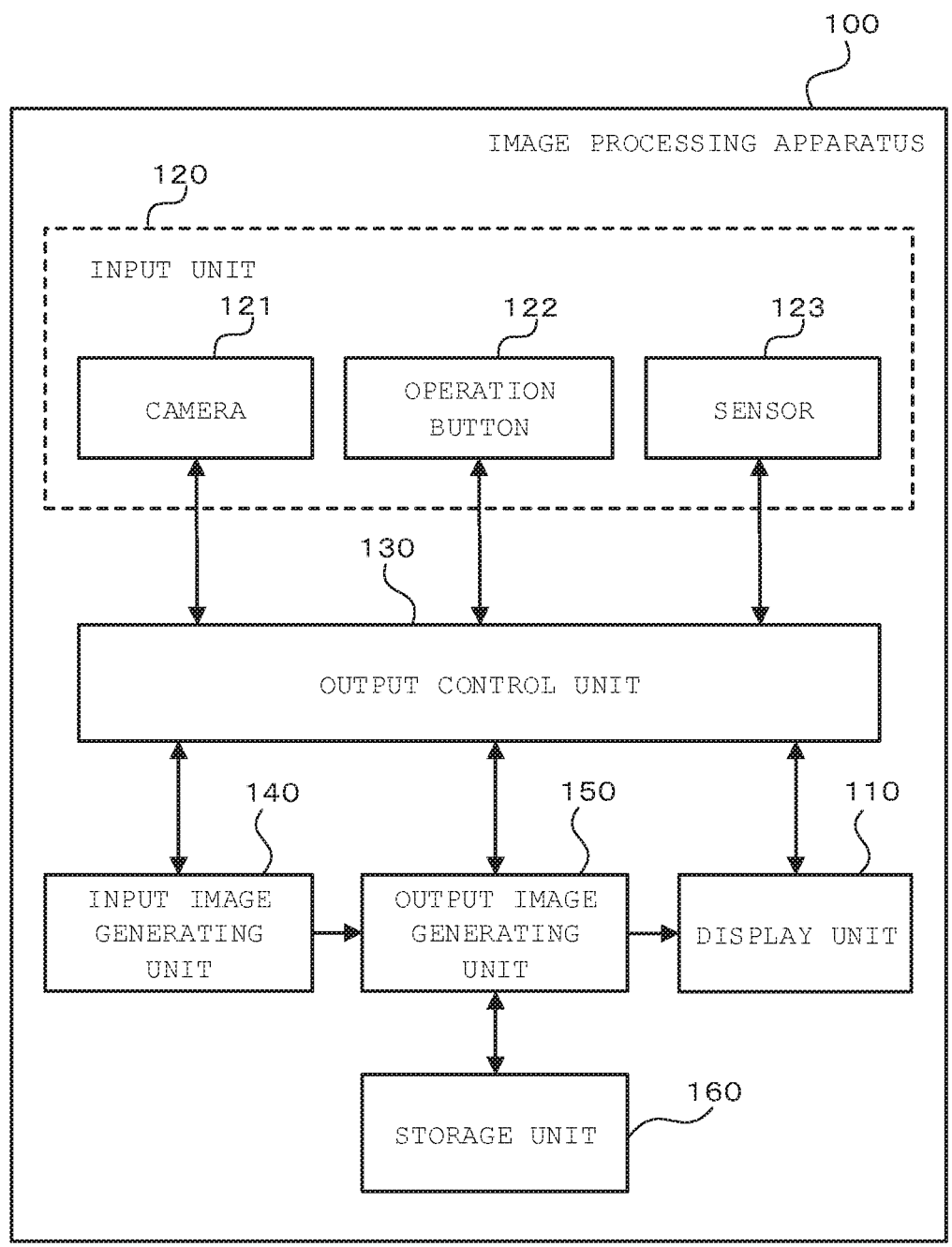
FIG. 2 is a block diagram of an image display apparatus of the first embodiment.

FIG. 2 is a block diagram of the image display apparatus 100. The image display apparatus 100 includes the display unit 110, an input unit 120, a control unit 130, an input image generating unit 140, an output image generating unit 150, and a storage unit 160.

The display unit 110 is a display apparatus, such as a liquid crystal display or an organic electro-luminescent display. The display unit 110 displays an image generated by the output image generating unit 150 according to the control of the control unit 130. The display unit 110 displays an image on the screen by successively scanning the image in a horizontal and forward direction (from left to right of the drawing). A direction in which the display unit 110 scans the image will be referred to as a "scanning direction" in the following description. In the present embodiment, the scanning direction is the horizontal and forward direction when the image display apparatus 100 (or the display unit 110) is in the normal state.

The input unit 120 is an input apparatus used to input various pieces of information to the image display apparatus 100. The input unit 120 includes the camera 121, the operation button 122, and a sensor 123. The camera 121 is an image capturing apparatus used to input images to the image display apparatus 100. The operation button 122 is a user interface used by a user to provide an instruction to the image display apparatus 100. The sensor 123 detects an inclination (rotation position) of the image display apparatus 100.

The control unit 130 is a display apparatus such as a processor. The control unit 130 is operated according to a program stored in read only memory (ROM), random access memory (RAM), or the like, which is not illustrated, to control various parts of the image display apparatus 100.

The control unit 130 has the function of determining a rotation state of the image display apparatus 100 (or the display unit 110). The control unit 130 determines, according to a signal from the sensor 123, if the image display apparatus 100 (or the display unit 110) is in the normal state, a left rotation state, a right rotation state, or a 180-degree rotation state. The left rotation state refers to a state where the image display apparatus 100 is rotated by 90 degrees to the left from the normal state. The right rotation state refers to a state where the image display apparatus 100 is rotated by 90 degrees to the right from the normal state. The 180-degree rotation state refers to a state where the image display apparatus 100 is rotated by 180 degrees from the normal state. A determination result of the rotation state is appropriately transmitted from the control unit 130 to the output image generating unit 150.

The image display apparatus 100 has a panel self refresh (PSR) function. In the present embodiment, the power consumption of the image display apparatus 100 is decreased by stopping the operation of the input image generating unit 140 by the control unit 130 while the output image generating unit 150 is operated after the input image is transmitted from the input image generating unit 140 to the output image generating unit 150.

The input image generating unit 140 is a display apparatus such as a processor. The input image generating unit 140 generates a non-compression image to be displayed on the display unit 110 according to an input or the like from the input unit 120. The input image generating unit 140 transmits the generated image to the output image generating unit 150 according to the control of the control unit 130. The non-compression image generated by the input image generating unit 140 will be referred to as the input image in the following description.

Figure 3:
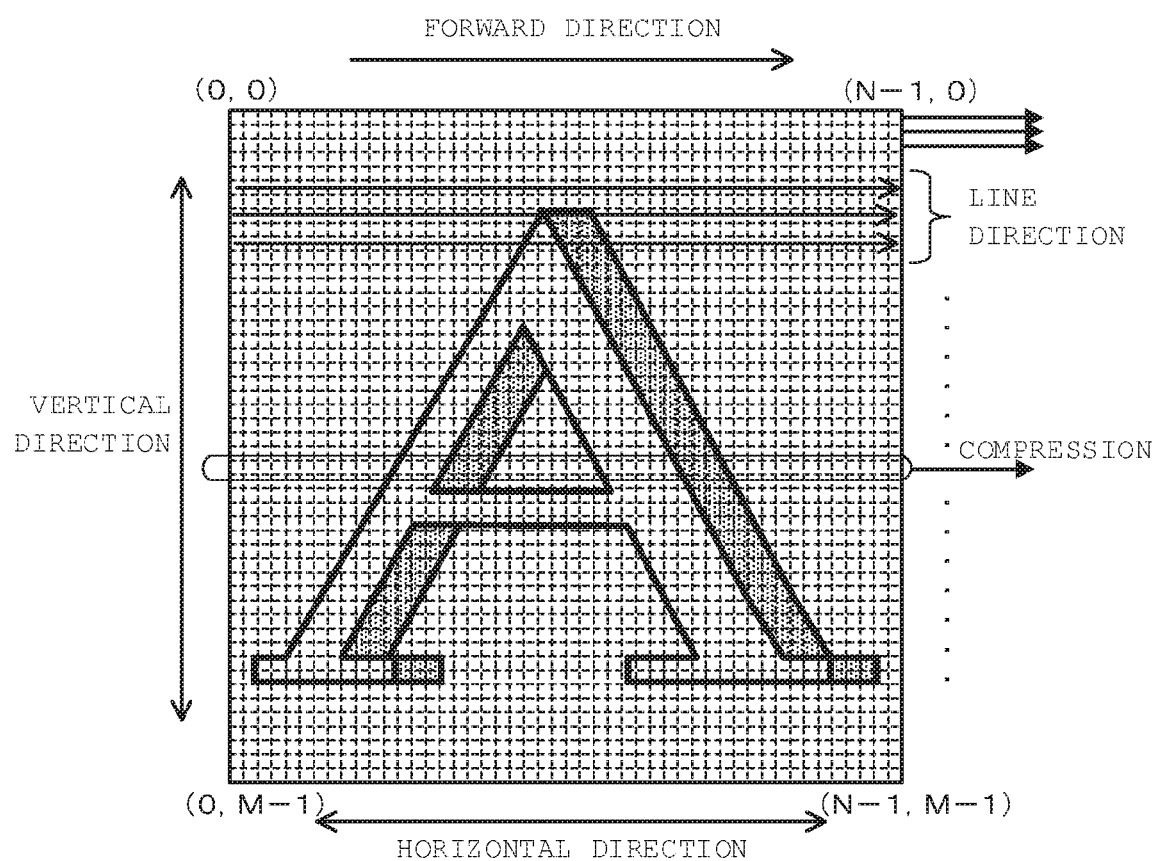
FIG. 3 illustrates an example of an input image generated by an input image generating unit.

FIG. 3 illustrates an example of the input image generated by the input image generating unit 140. Partitions of pixels are indicated by broken lines in the drawing. The input image is regarded as being consisted of N×M pixels in the following description. The horizontal and forward direction of the input image will be referred to as the line direction.

The output image generating unit 150 is a display apparatus such as a processor. For example, the output image generating unit 150 is a semiconductor device having an image compression/expansion function. The output image generating unit 150 is operated by a program stored in the ROM or RAM, which is not illustrated, to perform various operations.

Figure 4:
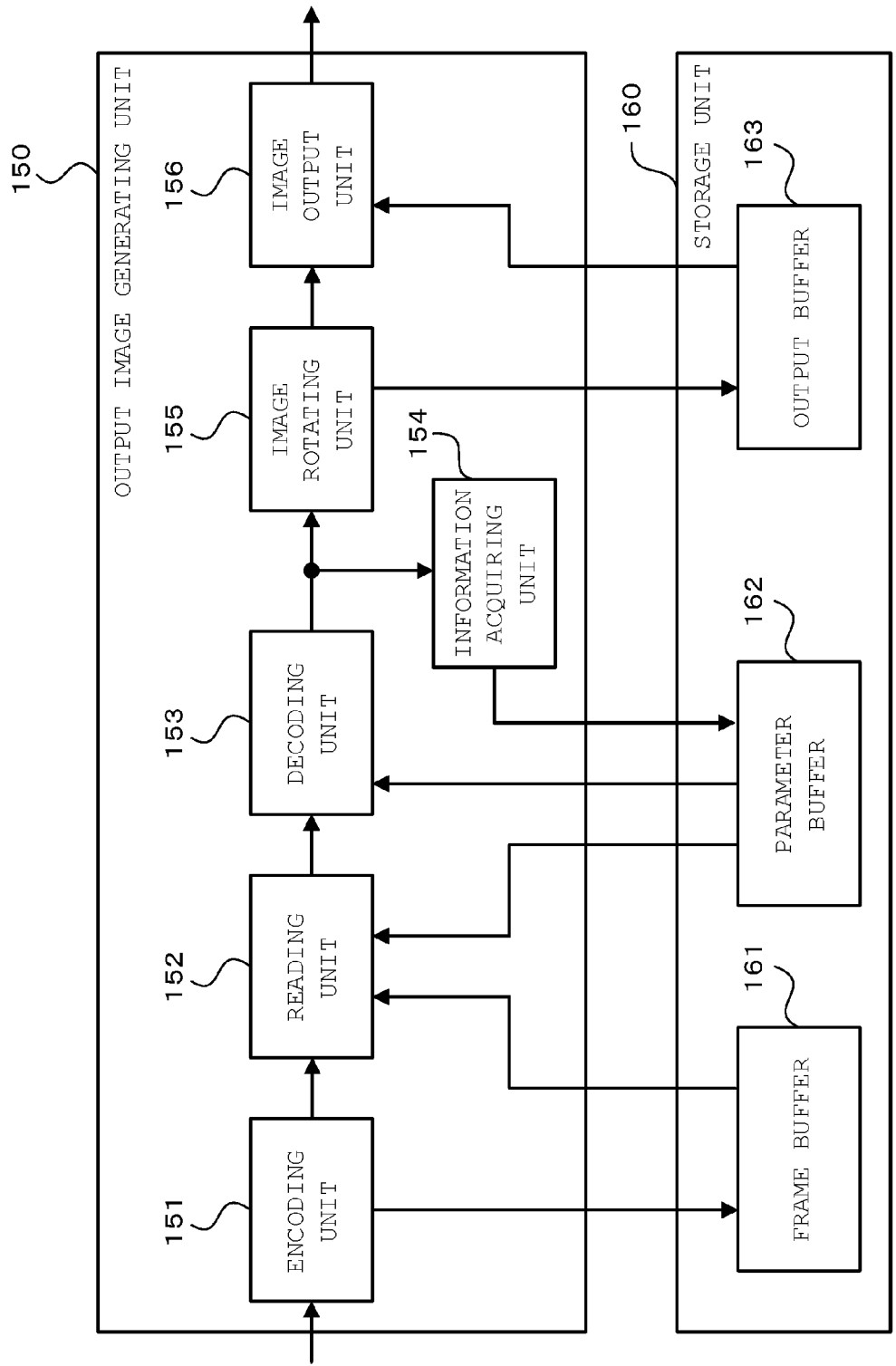
FIG. 4 is a block diagram of an output image generating unit and a storage unit included in the image display apparatus of the first embodiment.

FIG. 4 is a block diagram of the output image generating unit 150 and the storage unit 160. The output image generating unit 150 includes an encoding unit 151, a reading unit 152, a decoding unit 153, an information acquiring unit 154, an image rotating unit 155, and an image output unit 156. The output image generating unit 150 may be formed by one processor, or may be formed by a plurality of processors.

The storage unit 160 is a storage apparatus capable of reading/writing of data, such as dynamic random access memory (DRAM), static random access memory (SRAM), semiconductor memory, or a hard disc. The storage unit 160 includes a frame buffer 161, a parameter buffer 162, and an output buffer 163.

The frame buffer 161 temporarily holds a compressed image formed by compressing the input image. The parameter buffer 162 stores various parameters (e.g., decode information such as a quantization coefficient) used by the output image generating unit 150 to expand images. The output buffer 163 stores an image expanded by the output image generating unit 150 for use in generating a video signal.

Next, an operation of the image display apparatus 100 is described.

Figure 5:
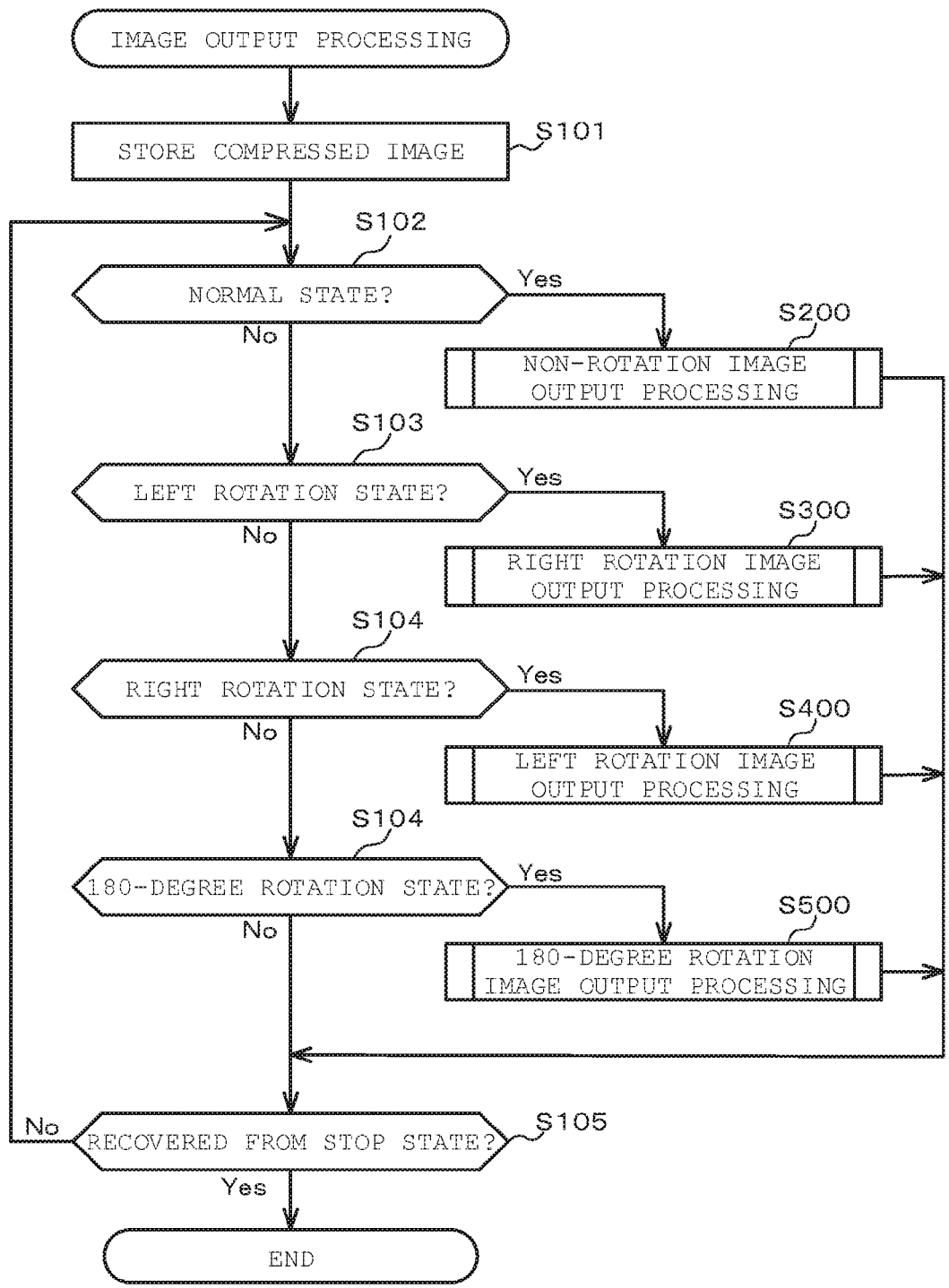
FIG. 5 is a flowchart of image output processing.

When the input image generating unit 140 transmits the input image to the output image generating unit 150, the control unit 130 issues a start instruction to start image output processing to the output image generating unit 150. At this time, the control unit 130 transmits a stop signal to the input image generating unit 140 to stop operation of the input image generating unit 140. Upon receiving the start instruction of the image output processing, the output image generating unit 150 starts the "image output processing". FIG. 5 is a flow chart of the image output processing.

The encoding unit 151 compresses the received input image for each line. The encoding unit 151 then stores the compressed input image (hereinafter referred to as the compressed image) in the frame buffer 161 (S101). For example, the encoding unit 151 performs compression for each line of the input image. A line compressed by the encoding unit 151 will be referred to as a compressed line in the following description.

The compressed line includes a plurality of compressed blocks. The compressed blocks are compressed pixel blocks formed by compressing pixel blocks obtained by dividing a line into several parts. For example, a pixel block may consist of n (n<N) pixels. A value n is obtained by dividing N into k equal parts (k is an arbitrary value). It is assumed that k=4 in the following description. That is, a pixel block consists of N/4 pixels.

Figure 6:
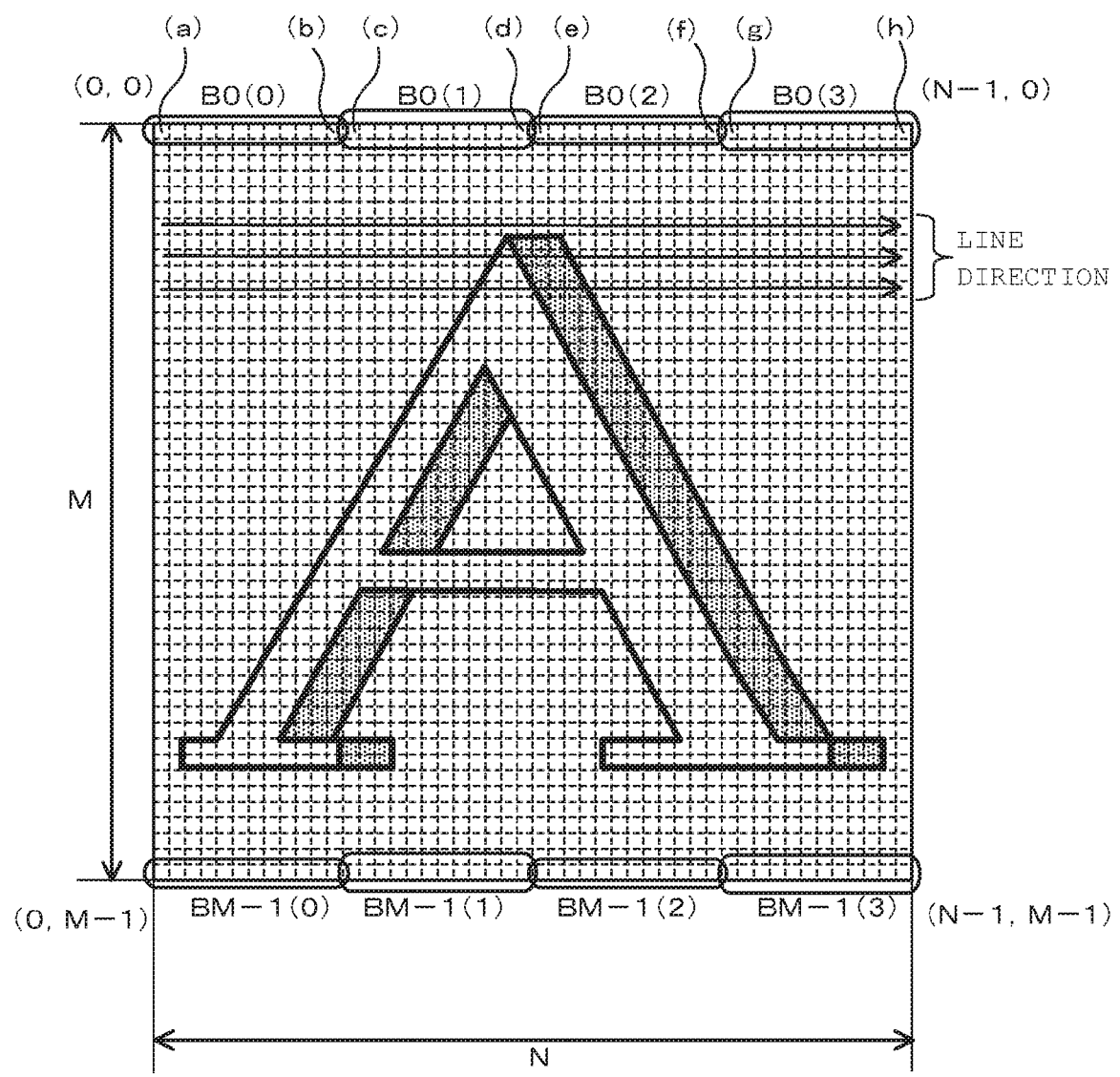
FIG. 6 is an explanatory view of pixel blocks.

FIG. 6 is an example of the input image. A line includes four pixel blocks Bm (0) to Bm (3) (m=0 to M−1). A first pixel block Bm (0) consists of N/4 pixels from (0, m) to (N/4−1, m). A second pixel block Bm (1) consists of N/4 pixels from (N/4, m) to (2N/4−1, m). A third pixel block Bm (2) consists of N/4 pixels from (2N/4, m) to (3N/4−1, m). A fourth pixel block Bm (3) consists of N/4 pixels from (3N/4, m) to (N−1, m).

The encoding unit 151 compresses a pixel block using information of another pixel block in the same line to increase a compression efficiency of the input image. For example, the encoding unit 151 may compress a pixel block using another pixel block placed ahead of the pixel block (in a direction opposite to the line direction) in the same line as a reference block, and refer to the pixels arranged in the line direction in the block as prediction pixels (hereinafter this type of compression will be referred to as "forward reference compression"). For example, in the case of compressing the pixel block Bm (3), the encoding unit 151 executes compression using the pixel block Bm (2) located one place ahead of the pixel block Bm (3) as a reference block. The encoding unit 151, for example, may calculate a difference between the pixel blocks Bm (2) and Bm (3), and performs entropy compression on the calculated difference by using run-length encoding, Huffman encoding, etc. In the case of compressing the pixel block Bm (0), the encoding unit 151 compresses the pixel block Bm (0) alone, because no pixel block is present ahead of the pixel block Bm (0).

Meanwhile, the encoding unit 151 may also compress a pixel block using another pixel block placed in the rear part of the same line as a reference block (and by referring to the pixels arranged in the reverse line direction in the block as reference pixels) (hereinafter this type of compression will be referred to as "backward reference compression"). For example, in the case of compressing the pixel block Bm (0), the encoding unit 151 executes compression using the pixel block Bm (1) arranged one place behind the pixel block Bm (0) as a reference block. When the pixel block Bm (3) is compressed, the encoding unit 151 executes compression with the pixel block Bm (3) alone, because no pixel block is present behind the pixel block Bm (3). The encoding unit 151 may also perform compression using a pixel block alone without referring to other pixel blocks (hereinafter such compression will be referred to as "non-reference compression").

Figure 7:
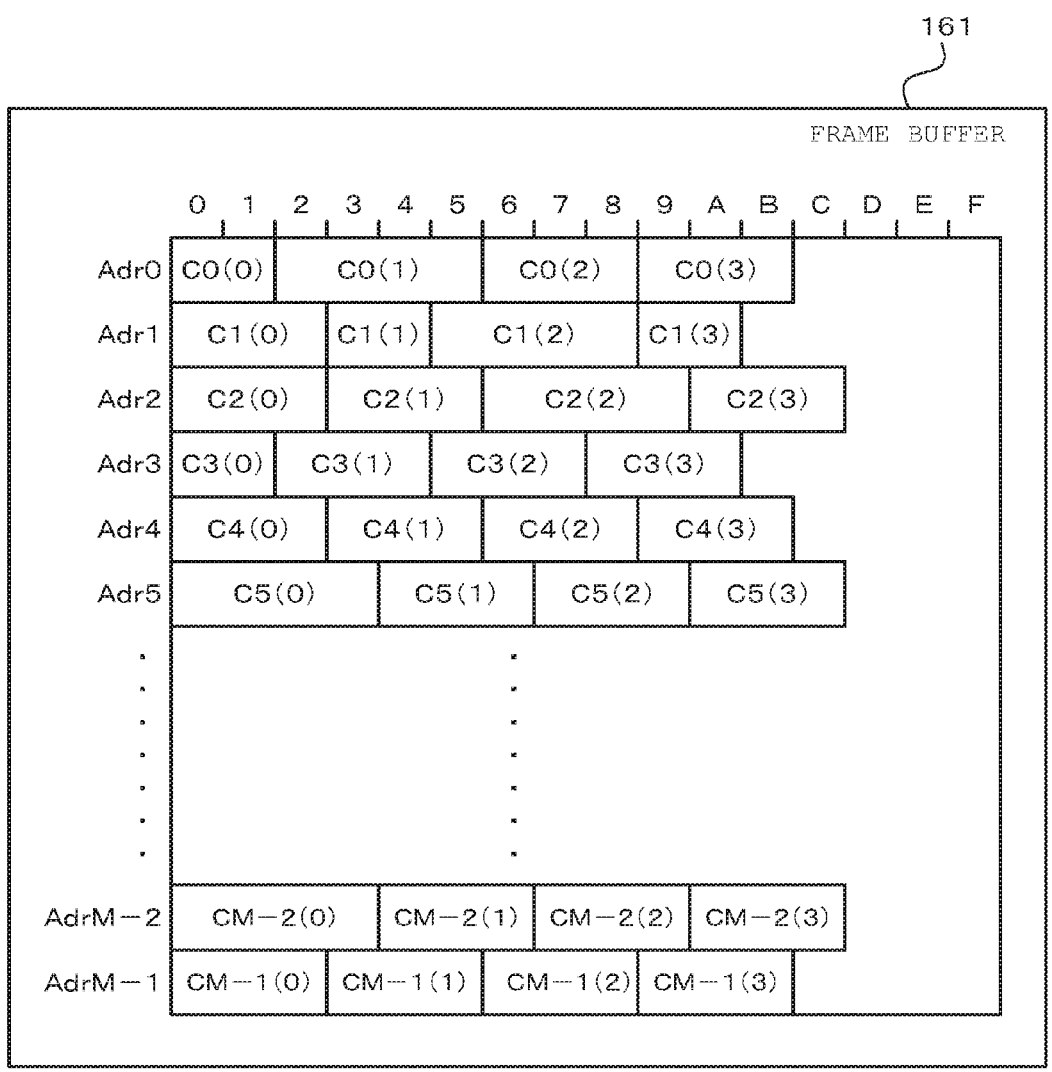
FIG. 7 illustrates compressed lines stored in the frame buffer.

FIG. 7 illustrates the frame buffer 161 in which compressed lines are stored. The frame buffer 161 includes M data regions. A unique address is attached to each data region. In the example of FIG. 7, addresses Adr0 to AdrM−1 have been attached. Each data region has a capacity capable of storing data equivalent to at least one compressed line. Each data region includes a plurality of regions. Each region has any data size. In the example of FIG. 7, the data region consists of 16 regions to which addressees 0 to F are attached. The addresses 0 to F will be referred to as address region numbers in the following description.

Each time a new compressed line is generated, the encoding unit 151 stores the compressed line in a new data region. In FIG. 7, Cm(n) (m=0 to M−1, n=0 to 3) represents a compressed block. Cm(n) corresponds to the pixel block Bm(n) of FIG. 6. One compressed line includes a plurality of compressed blocks stored in the same data region. For example, four compression blocks C0(0) to C0(3) stored in the data region Adr0 become the first compressed line of the input image. The encoding unit 151 may use an irreversible compression system in order to guarantee a compression rate. For example, the encoding unit 151 may use the irreversible compression system in which encoding is performed after a difference is determined and quantization is performed, with left-hand pixels being reference pixels. The compressed blocks have different lengths as illustrated in FIG. 7.

Figure 8A:
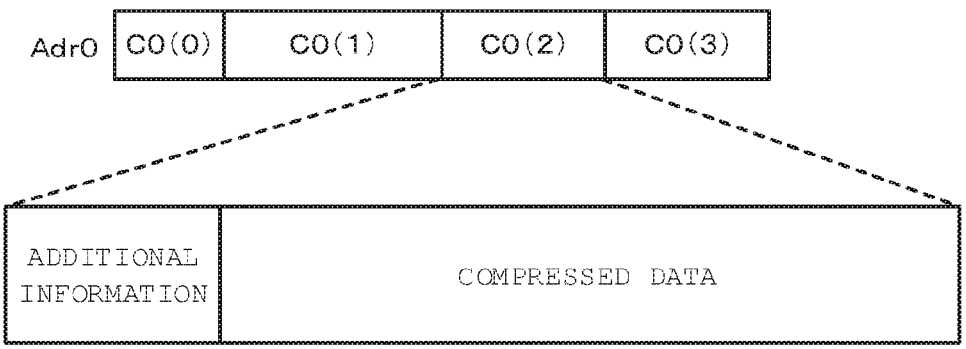
FIG. 8A illustrates a compressed block with additional information attached to the head of the compressed block.
Figure 8B:
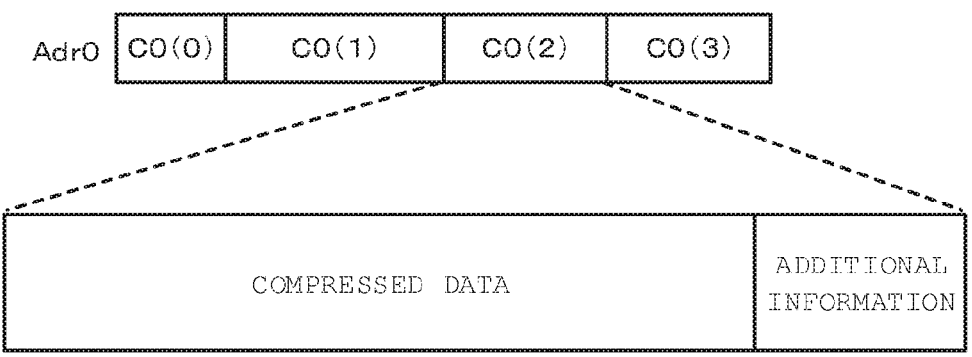
FIG. 8B illustrates an compressed block with additional information attached to the tail of the compressed block.
Figure 8C:
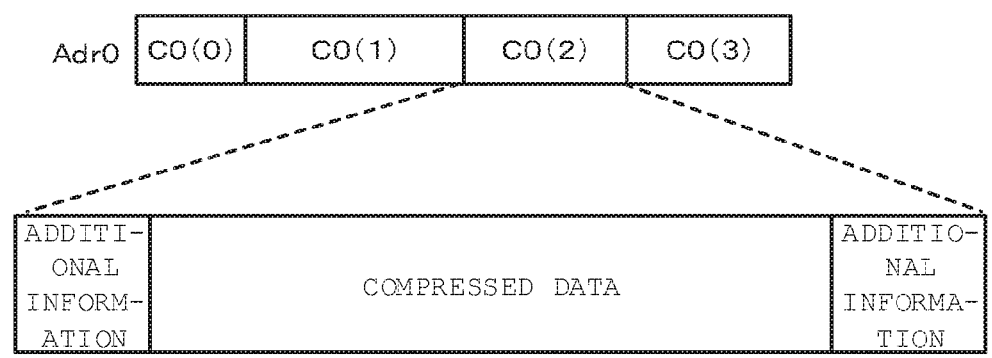
FIG. 8C illustrates an compressed block with additional information attached to both head and tail of the compressed block.

The encoding unit 151 attaches additional information to the compressed blocks when storing the compressed blocks in the frame buffer 161. The additional information includes a data size and forward block information. FIGS. 8A to 8C illustrate examples of the compressed block with additional information attached thereto. In FIG. 8A, the additional information is attached to the head of the compressed block. In FIG. 8B, the additional information is attached to the tail of the compressed block. In FIG. 8C, the additional information is attached to both head and tail of the compressed block. For example, the data size may be attached to the head and the forward block information may be attached to the tail. The additional information may not be compressed, or the additional information alone may be compressed in an expandable manner.

The data size refers to information representing the size of the compressed block to be stored. The forward block information refers to information (e.g., start address) to identify a compressed block located one place ahead of the compressed block in the same line. In the case of the compressed block C0(2) of FIG. 7, for example, the data size "3" and the forward block information "2" have been attached as the additional information.

Figure 9:
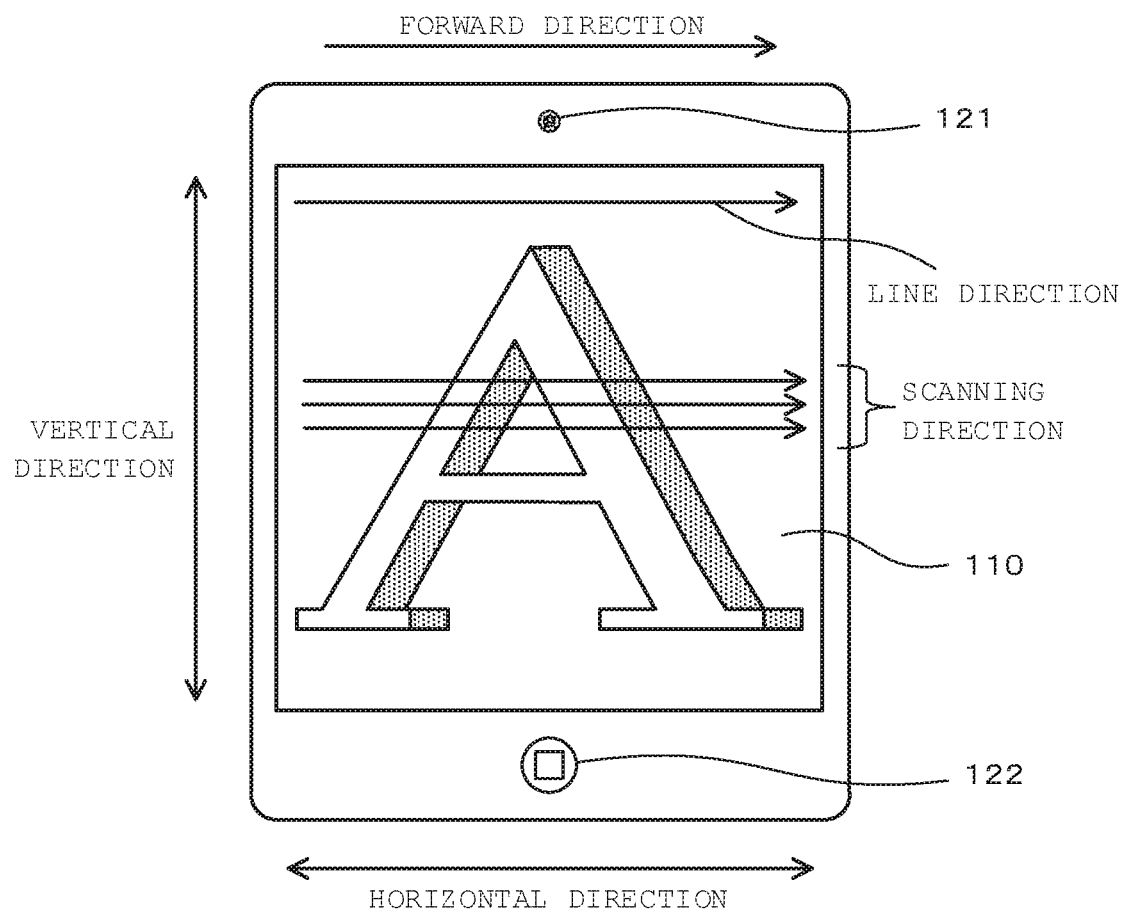
FIG. 9 illustrates a non-rotation image displayed on a display unit.
Figure 10:
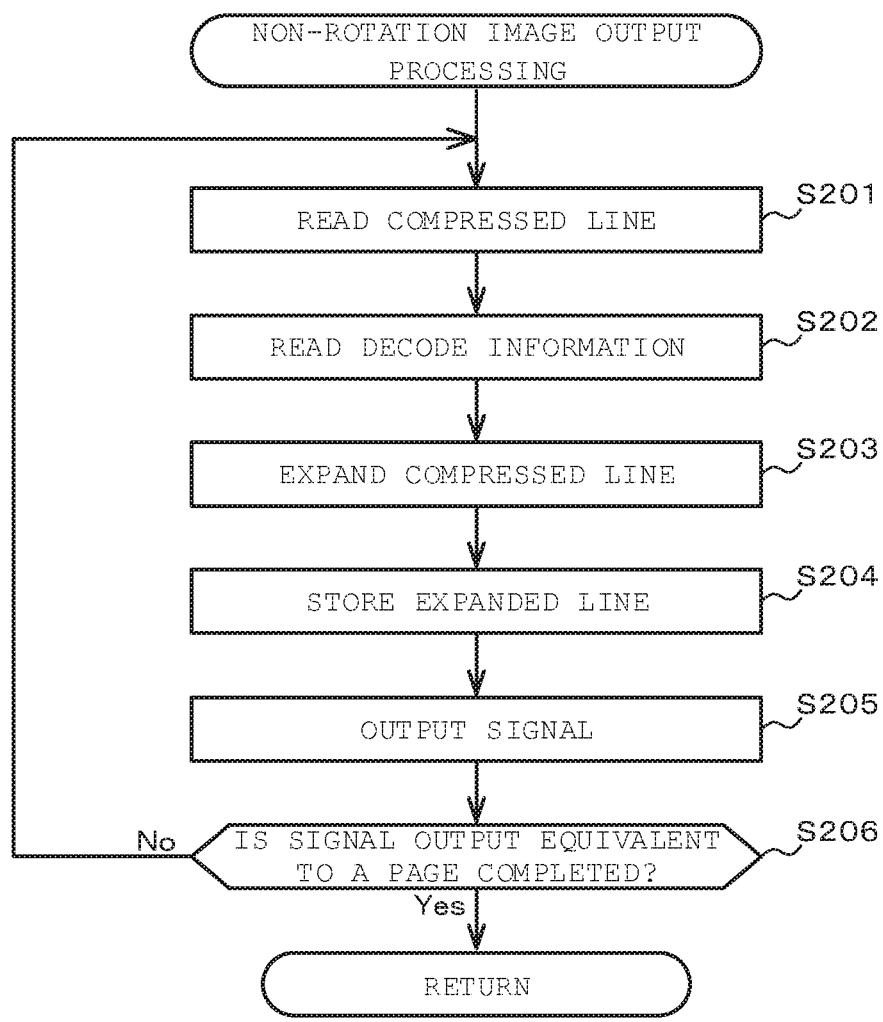
FIG. 10 is a flowchart of non-rotation image output processing of the first embodiment.

When the storage of the compressed image is completed, the output image generating unit 150 determines whether the image display apparatus 100 is in the normal state (S102). If the image display apparatus 100 is in the normal state (Yes at S102), the output image generating unit 150 starts non-rotation image output processing (S200). In the non-rotation image output processing, a non-rotation image is output to the display unit 110. In the non-rotation image, the line direction of the image and the scanning direction of the display unit 110 coincide with each other. FIG. 9 is an example of the non-rotation image displayed on the display unit 110. The image display apparatus 100 outputs the video signal along the line direction (which is also called "horizontal raster output"). FIG. 10 is a flowchart of the non-rotation image output processing. The non-rotation image output processing will be described below by referring to the flowchart of FIG. 10.

The reading unit 152 reads the compressed line from the frame buffer 161 (S201). The reading unit 152 then reads the decode information from the parameter buffer 162 (S202). The decode information may be information such as longitudinal/lateral sizes of the input image, a bit depth, a compression rate of the compressed line, a compression standard to be used, and so on. The decoding unit 153 uses the decode information to expand the compressed line having been read in S201 (S203).

Figure 11:
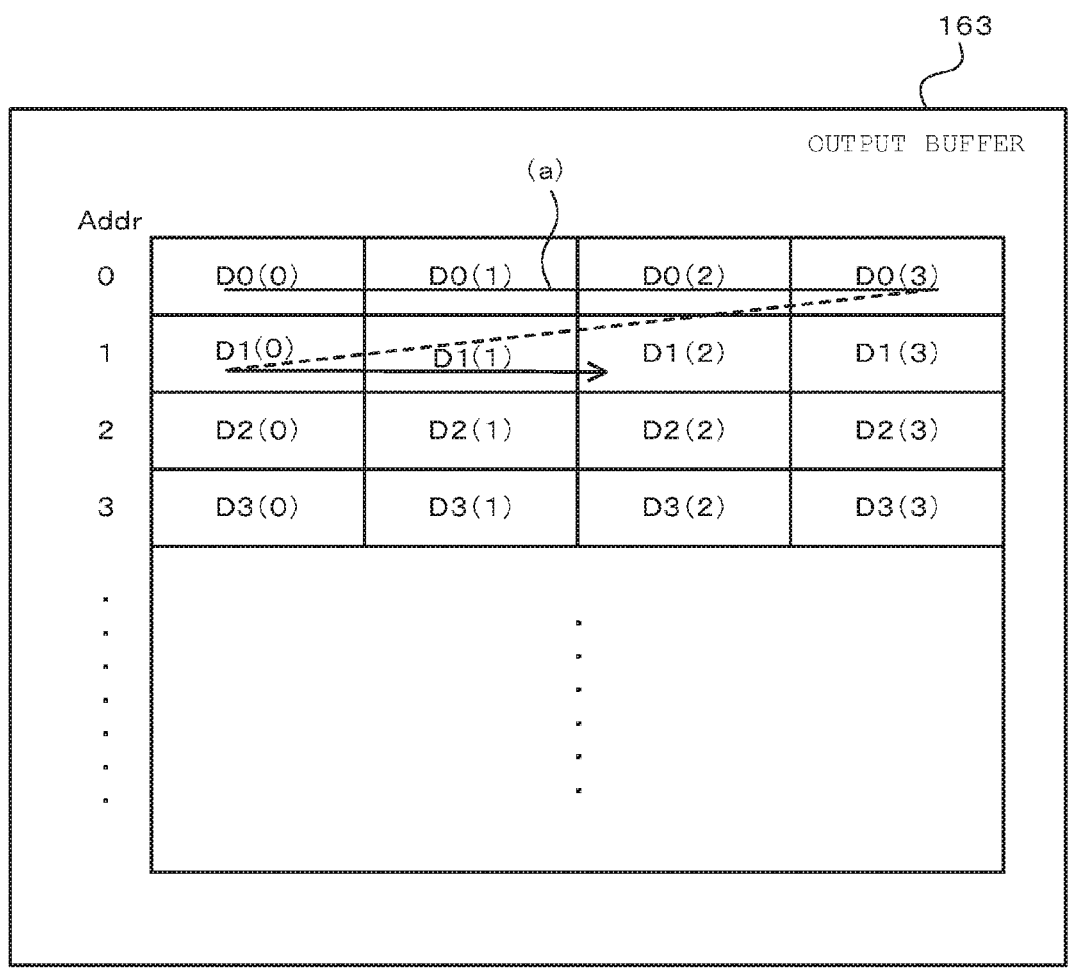
FIG. 11 illustrates expanded lines stored in the output buffer.

Next, the image rotating unit 155 stores the expanded compressed line (hereinafter referred to as the expanded line) in the output buffer 163 (S204). FIG. 11 illustrates the output buffer 163 in which the expanded lines are stored. In the drawing, D0(0), D0(1), etc. represent expanded blocks of the compressed blocks C0(0), C0(1), etc. The expanded line including D0(0) to D0(3) corresponds to the compressed line C0. The image output unit 156 successively outputs the expanded lines stored in the output buffer 163 to the display unit 110 along an arrow (a) illustrated in FIG. 11 (S205).

The output image generating unit 150 determines whether an output of the image equivalent to one page (i.e., equivalent to M lines) has been completed (S206). If the output is not completed yet (No at S206), the process returns to S201. If the output has been completed (Yes at S206), the output image generating unit 150 ends the non-rotation image output processing.

Figure 12A:
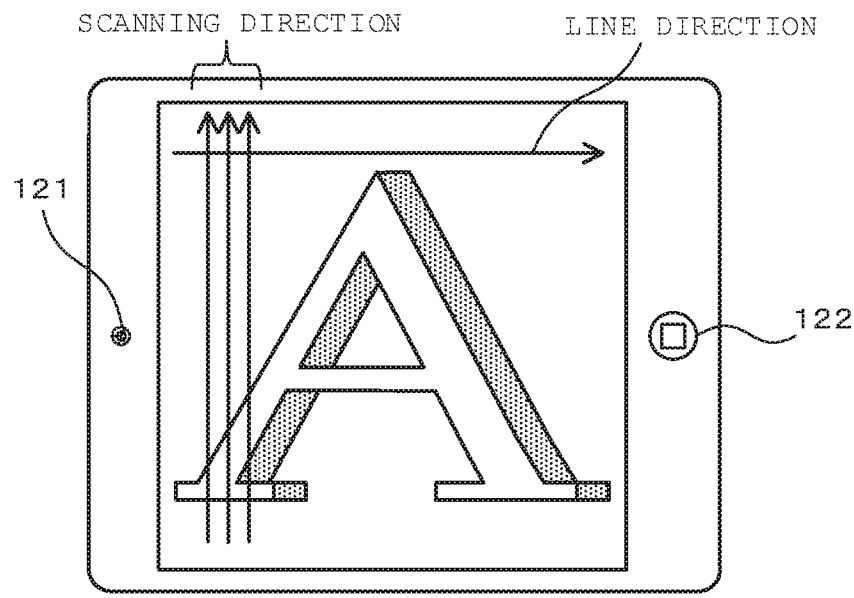
FIG. 12A illustrates a right rotation image displayed on the image display unit that is rotated to the left.

Meanwhile, if the image display apparatus 100 is not in the normal state (No at S102), the output image generating unit 150 determines whether the image display apparatus 100 is in the left rotation state (S103). If the image display apparatus 100 is in the left rotation state (Yes at S103), the output image generating unit 150 starts right rotation image output processing (S300). In the right rotation image output processing, a right rotation image is output on the display unit 110. The right rotation image is rotated by 90 degrees to the right relative to the non-rotation image. FIG. 12A is an example of the right rotation image displayed on the image display apparatus 100 that is in the left rotation state. To facilitate understanding, FIG. 12B illustrates an example of the right rotation image displayed on the image display apparatus 100 that is in the normal state.

Figure 12B:
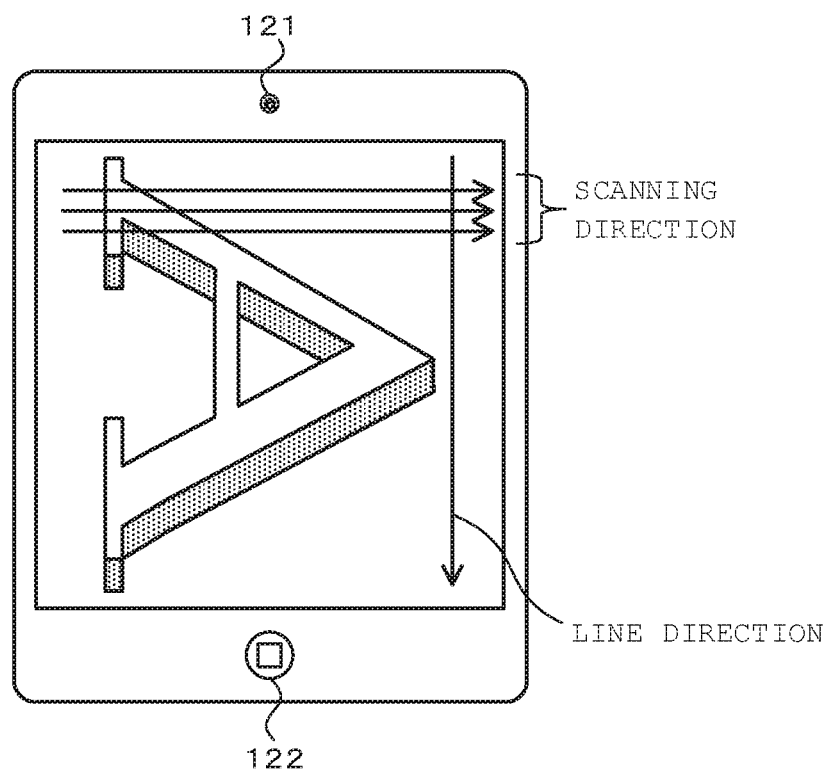
FIG. 12B illustrates a right rotation image displayed on the image display unit that is in the normal state.
Figure 13:
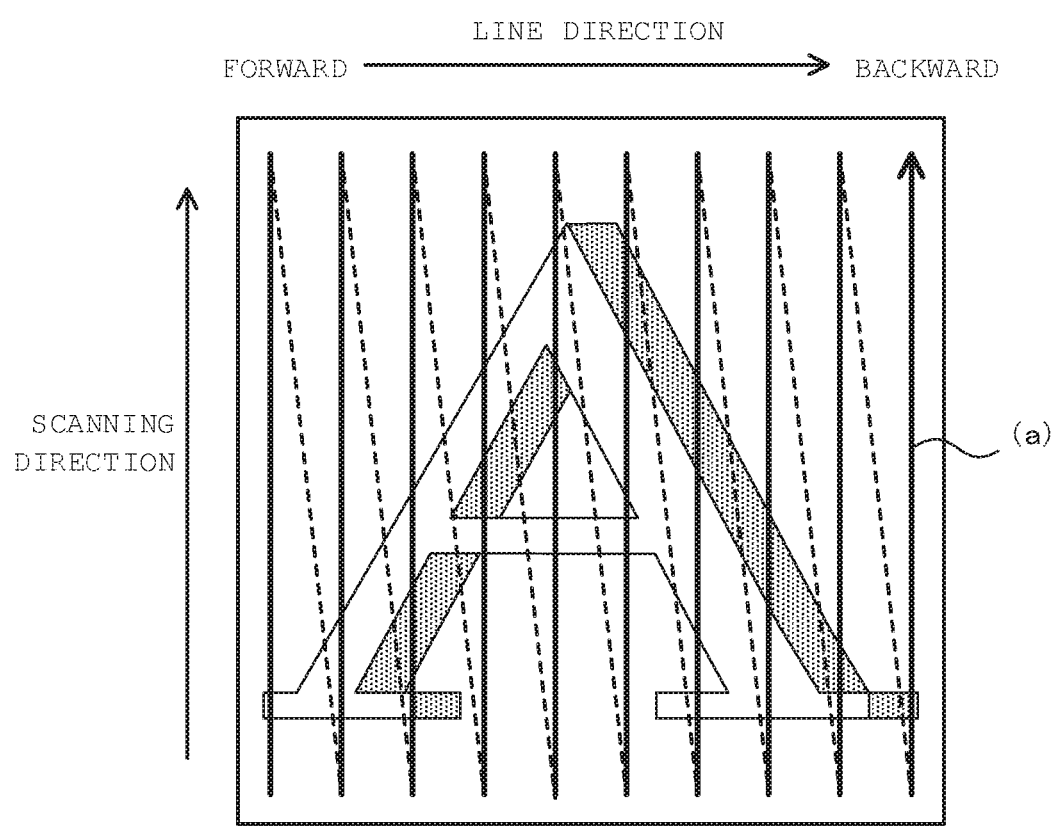
FIG. 13 is an explanatory view of vertical raster output.

As illustrated in FIG. 12B, when the image display apparatus 100 outputs the right rotation image, the scanning direction of the display unit 110 does not match the line direction of the display image. To output the video signal along the scanning direction, the output image generating unit 150 needs to vertically output the video signal backward from the front of the line (which is also called "vertical raster output"), as illustrated by an arrow (a) in FIG. 13. In many cases, however, since the input image is compressed for each line, the image display apparatus 100 needs to once expand M compressed lines to vertically output the video signal. In this case, it takes longer till the image output is started and larger memory consumption is required.

The output image generating unit 150, therefore, holds progress information of the expansion (e.g., position information 162a or decode information 162b which will be described later) in the parameter buffer 162, in order to allow vertical reading of the compressed blocks backward from the front of the line, as illustrated by an arrow (a) in FIG. 14. Accordingly, the image display apparatus 100 does not need to once expand all compressed lines to vertically output the video signal.

Figure 15:
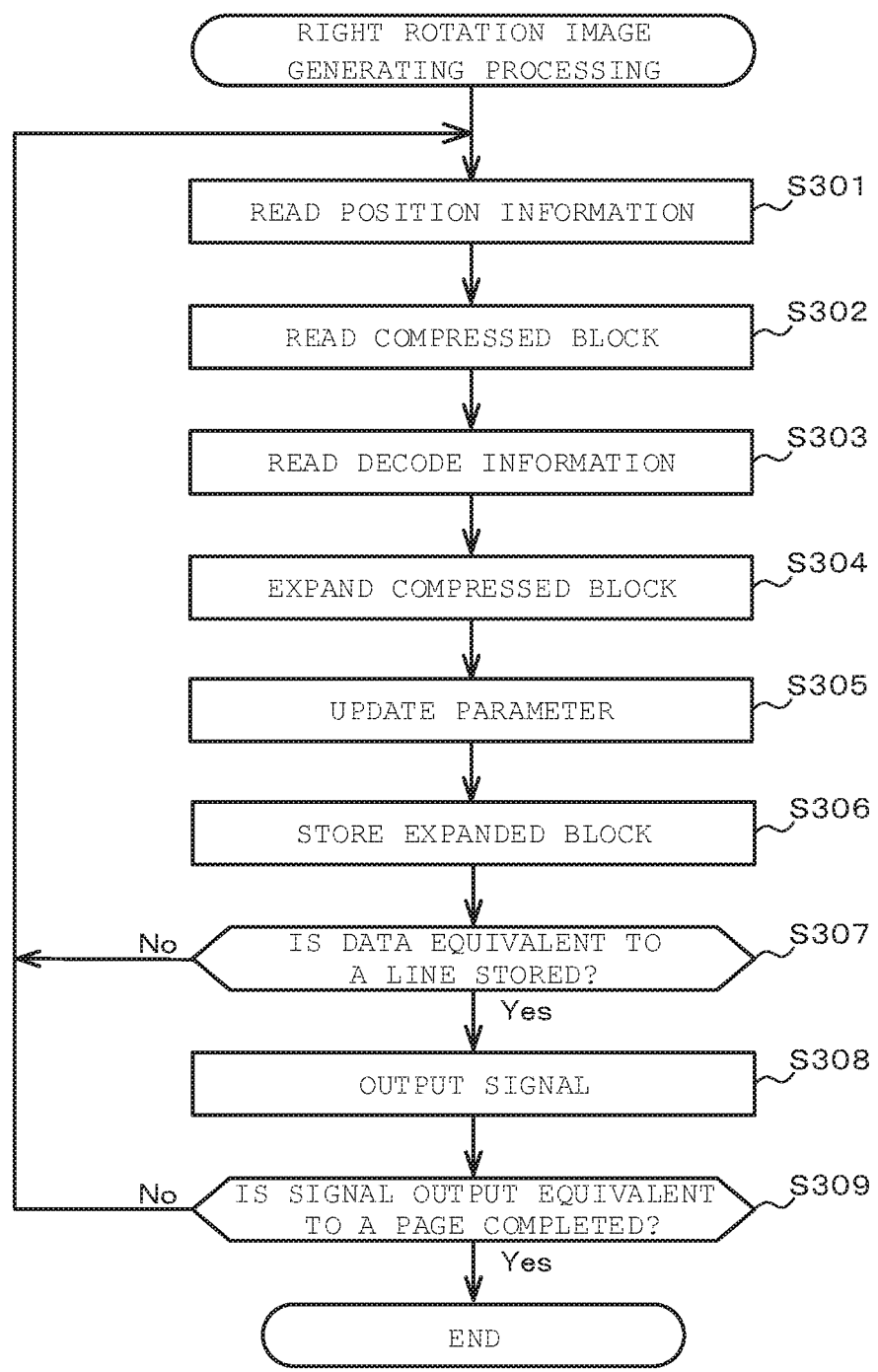
FIG. 15 is a flowchart of the right rotation image output processing.

When the compression processing in S101 is the backward reference compression, the output image generating unit 150 issues an instruction to the encoding unit 151 to re-compress the input image before executing the right rotation image output processing. The encoding unit 151 compresses the input image by the forward reference compression. When the compression processing in S101 is the forward reference compression, the output image generating unit 150 executes the right rotation image processing without instructing re-compression. The right rotation image output processing will be described below by referring to the flowchart of FIG. 15.

The reading unit 152 reads the position information 162a from the parameter buffer 162 (S301). The position information 162a identifies an address in the next compressed block to be expanded by the decoding unit 153.

Figure 16:
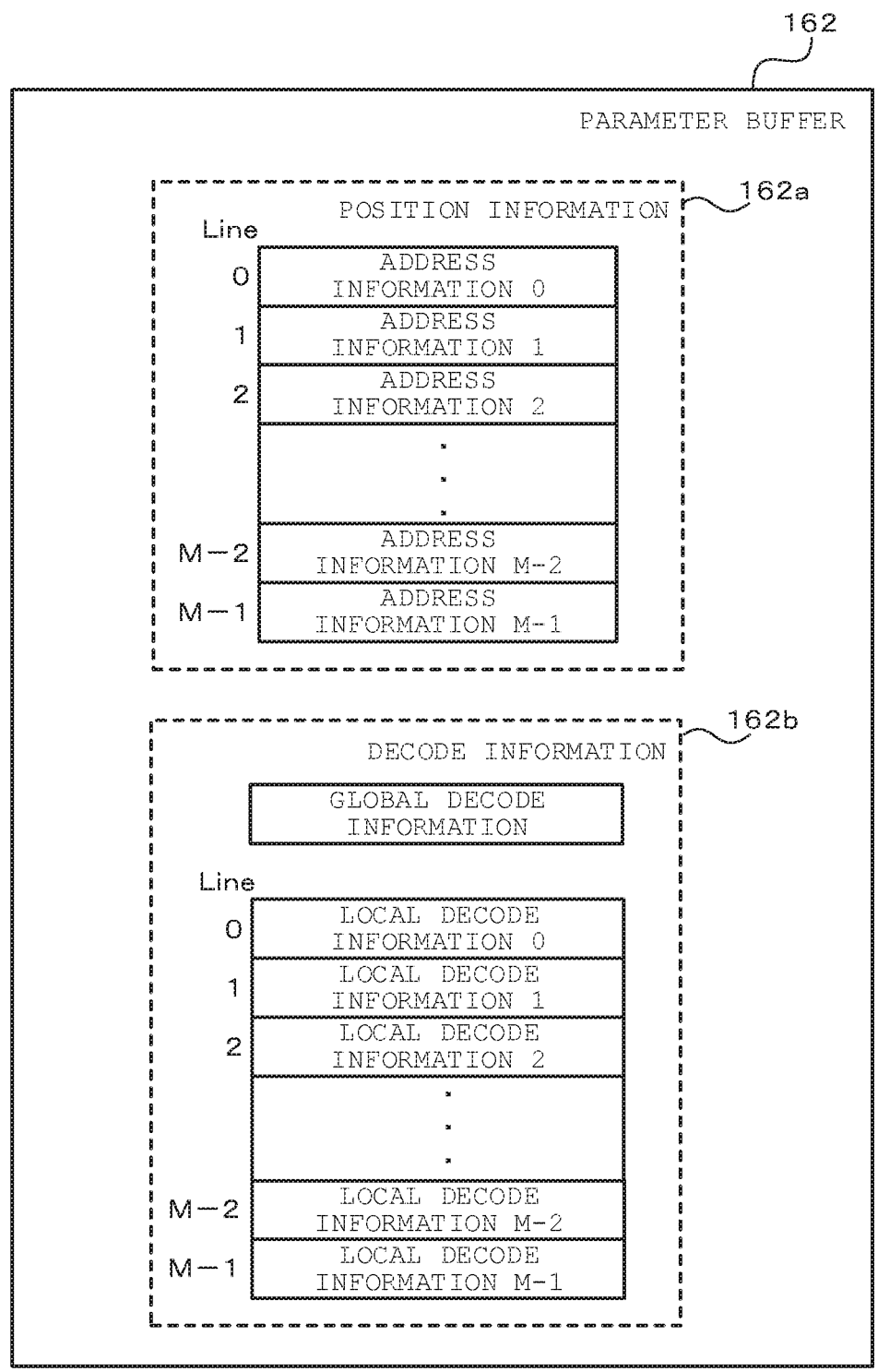
FIG. 16 illustrates an example of a data structure including position information and decode information.

FIG. 16 is an example of a data structure of the position information 162a. The position information 162a includes multiple pieces of address information. Each piece of address information corresponds to each line. For example, the first address information 0 corresponds to the first line of the input image. The last address information M−1 corresponds to the last line of the input image. The address information is, for example, a leading address of the next compressed block to be expanded in the line. If the decoding unit 153 has already completed the expansion of the compressed block C0(0), the address information 0 is the start address (i.e., (Adr0, Region Number 2)) of the compressed block C0(1). If the expansion of the compressed block C0(0) is not completed yet, the address position (e.g., a bit position) indicating the address of the compressed block is stored.

Figure 14:
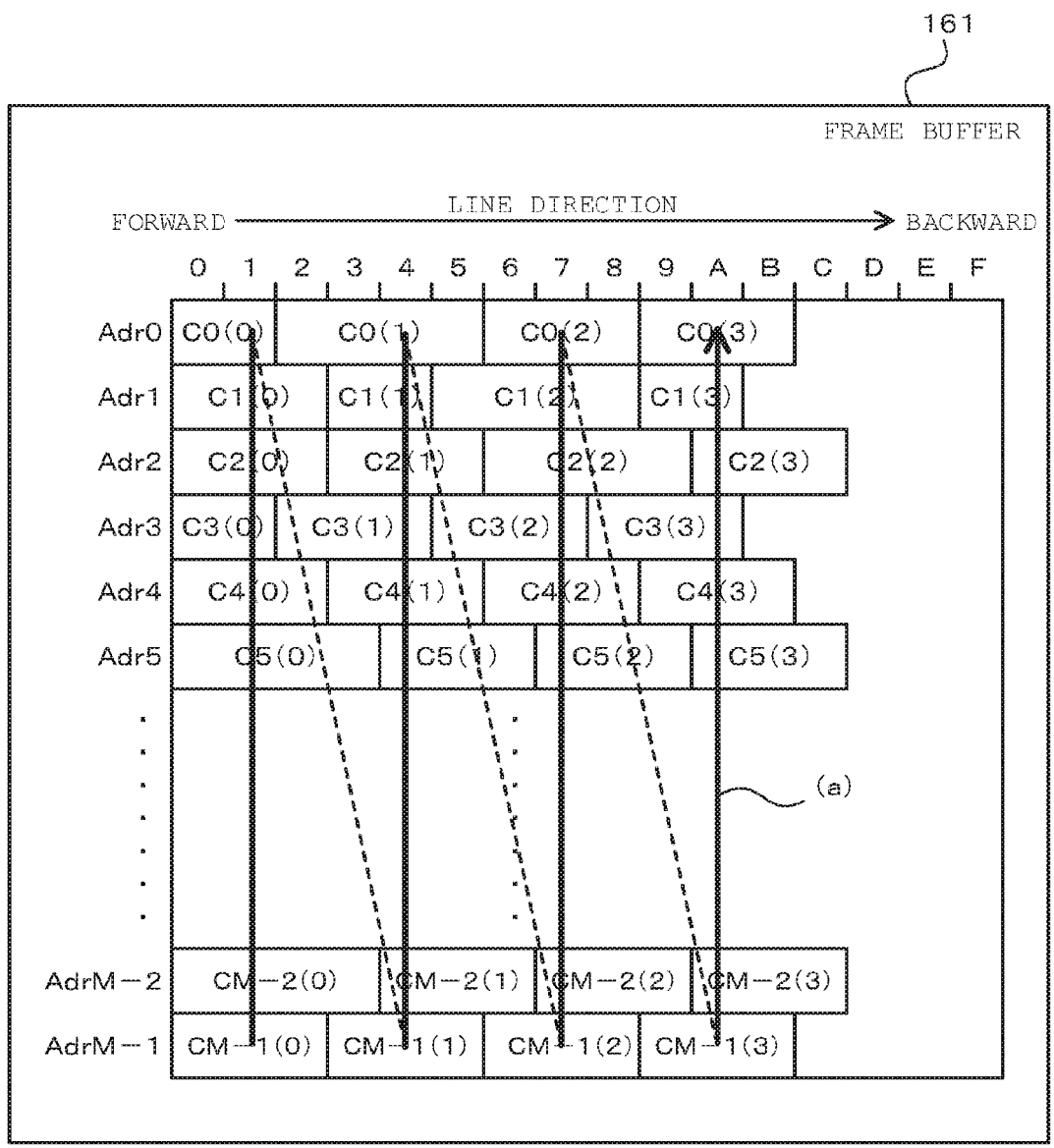
FIG. 14 illustrates reading order to read the compressed blocks in the case of right rotation image output processing.

The reading unit 152 selects the address information such that the reading is performed in the order along the arrow (a) illustrated in FIG. 14. First, the reading unit 152 reads the address information M−1. The reading unit 152 then reads the address information M−2. Upon completion of reading of the address information 0, the reading unit 152 reads the address information M−1 again.

The reading unit 152 then reads the compressed block from the frame buffer 161 according to the address information having been read above (S302). For example, if the address information is ("Adr0, Region Number 2"), the reading unit 152 may read blocks starting from the block C0(1) from the frame buffer 161.

The reading unit 152 then reads the decode information 162*b* from the parameter buffer 162 (S303). The decode information 162*b* is used to expand the compressed block by the decoding unit 153. The decode information 162*b* includes global decode information and multiple pieces of local decode information 162*b*. The reading unit 152 reads the global decode information and the local decode information of the compressed block having been read from the decode information 162*b*.

Figure 17:
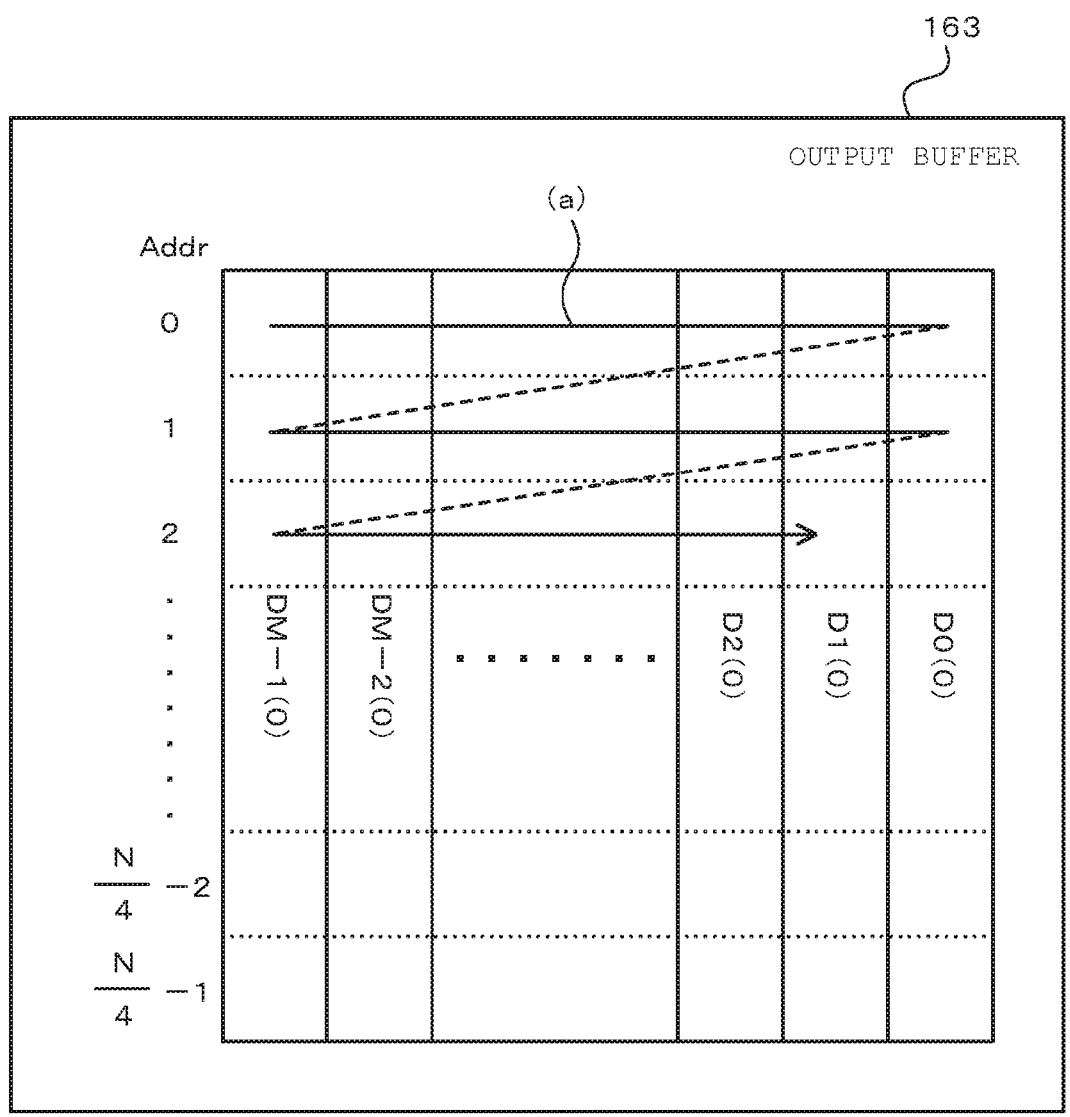
FIG. 17 illustrates expanded blocks stored in the output buffer.

FIG. 17 is an example of a data structure of the decode information 162*b*. The global decode information is the information commonly used in a plurality of compressed blocks. The global decode information may be information such as the longitudinal/lateral sizes of the input image, the bit depth, the compression rate of the compressed line, the standard used for compression, the number of pixels in a pixel block, and so on. The global decode information may be stored in, for example, the parameter buffer 162 by the control unit 130 before the right rotation image output processing is started.

The local decode information is unique information specific to each compressed block. In the case of the right rotation image output processing, the local decode information is the information derived from the block to be expanded (the object block) or from the pixel block located ahead of the block to be expanded. For example, the local decode information may be an average pixel value of a pixel block located one place ahead (hereinafter referred to as a previous pixel block), or the previous pixel block itself. The local decode information may also be various coefficients used in compression/expansion, such as reference pixels and a quantization coefficient in the case of discontinuation half way through the block. The local decode information can be appropriately changed according to the compression method used by the encoding unit 151.

The decode information 162*b* includes multiple pieces of local decode information. Each piece of the local decode information corresponds to each line. In the case of the right rotation image output processing, the local decode information is the decode information of the next compressed block to be expanded in the same line. For example, the first local decode information 0 corresponds to the first line of the input image. If the decoding unit 153 has already completed the expansion of the compressed block C0(0), the local decode information 0 is the decode information of the compressed block C0(1). The last local decode information M−1 corresponds to the last line of the input image.

The decoding unit 153 expands the compressed block using the decode information having been read (S304). The information acquiring unit 154 updates the position information 162*a* and the decode information 162*b* stored in the parameter buffer 162 (S305). More specifically, the information acquiring unit 154 determines the start address of the next compressed block to be expanded in the same line, according to the information of the start address of the compressed block to be expanded and the data size. The information acquiring unit 154 updates the address information of the current line to be expanded.

In the present embodiment, the information acquiring unit 154 identifies, as a next compressed block to be expanded, a compressed block (hereinafter referred to as a subsequent compressed block) that is located one place behind the compressed block to be expanded. At this time, the information acquiring unit 154 identifies the start address of the subsequent compressed block according to the information of the data size of the compressed block. For example, if the compressed block C0(0) is to be expanded, the information acquiring unit 154 may determine the start address of the subsequent compressed block to be ("Adr0, Region Number 2"), according to the start address of C0(0) of ("Adr0, Region Number 2") and the data size of C0(0) of "2". The information acquiring unit 154 then rewrites the address information 0 as ("Adr0, Region Number 2").

The information acquiring unit 154 also extracts the local decode information used in expanding the subsequent compressed block from the expanded compressed block (hereinafter referred to as the expanded block). For example, the information acquiring unit 154 extracts an average pixel value of the expanded block as the local decode information of the next compressed block to be expanded. The information acquiring unit 154 updates the decode information of the line to be expanded. For example, if the compressed block of C0(0) is to be expanded, the information acquiring unit 154 rewrites the local decode information 0.

Next, the image rotating unit 155 stores the expanded block in the output buffer 163 (S306). FIG. 17 illustrates the output buffer 163 in which the expanded blocks are stored. The image rotating unit 155 successively writes the expanded blocks vertically to the output buffer 163. The vertical writing is to write and arrange the pixel data in the buffer in such a manner that the vertical direction of the image data coincides with the reading direction of the buffer (e.g., in order of the addresses, or in a direction along (a) in the example of FIG. 17).

Subsequently, the image output unit 156 determines whether the expanded blocks equivalent to one line have been stored in the output buffer 163. The image output unit 156 determines whether N expanded blocks (e.g., from DM−1 (0) to D0 (0)) have been stored horizontally in a line in the output buffer 163 (S307). If the expanded blocks equivalent to one line have not been stored (No at S307), the process returns to S301.

If the expanded blocks equivalent to one line have been stored (Yes at S307), the image output unit 156 outputs the expanded blocks stored in the output buffer 163 to the display unit 110 in order of the addresses (i.e., along an arrow (a) illustrated in FIG. 17) (S308).

The output image generating unit 150 determines whether the output of an image equivalent to one page (i.e., equivalent to M lines) has been completed (S309). If the output is not completed yet (No at S309), the process returns to S301. If the output has been completed (Yes at S309), the output image generating unit 150 ends the right rotation image output processing.

The output image generating unit 150 need not output the image equivalent to one page (equivalent to M lines) at a time to the display unit 110. The output image generating unit 150 can only output what is held so long as one line is held even when M lines are not fully provided. In the example of FIG. 14, a pixel in Cm(0) is decoded and then a pixel in the subsequent Cm−1(0) is decoded. When the image equivalent to one line is fully provided, the output image generating unit 150 outputs the image equivalent to one line to the display unit 110. This processing is also applicable to other types of processing described below, i.e., the right rotation image output processing, the left rotation image output processing, and the 180-degree rotation image output processing.

Figure 18A:
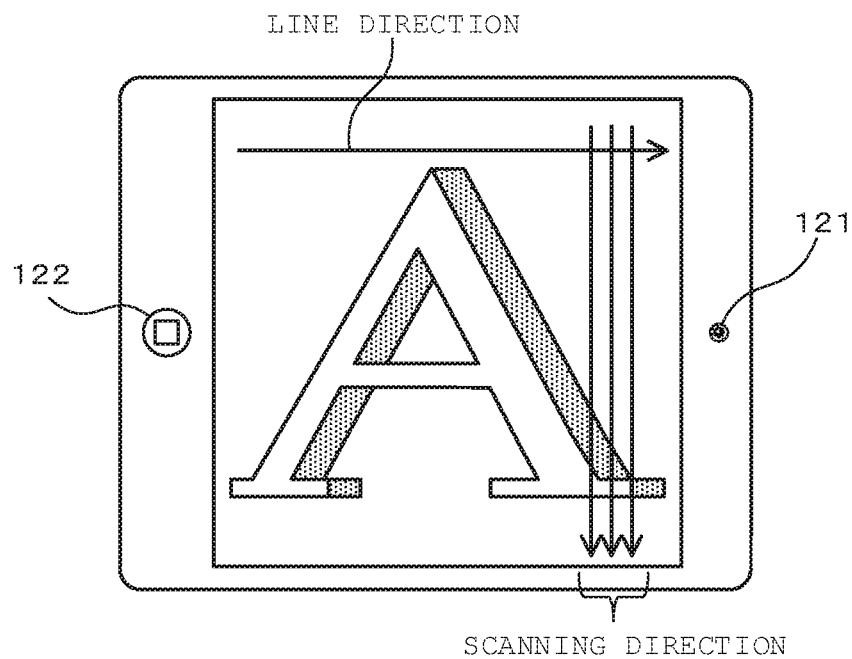
FIG. 18A illustrates a left rotation image displayed on the image display unit that is rotated to the right.

When the image display apparatus 100 is not in the left rotation state (No at S103), the output image generating unit 150 determines whether the image display apparatus 100 is in the right rotation state (S104). If the image display apparatus 100 is in the right rotation state (Yes at S104), the output image generating unit 150 starts the left rotation image output processing (S400). In the left rotation image output processing, the left rotation image is output on the display unit 110. The left rotation image is rotated by 90 degrees to the left relative to a non-rotation image. FIG. 18A is an example of the left rotation image displayed on the image display apparatus 100 that is in the right rotation state. To facilitate understanding, the example of the left rotation image displayed on the image display apparatus 100 that is in the normal state is illustrated in FIG. 18B.

Figure 18B:
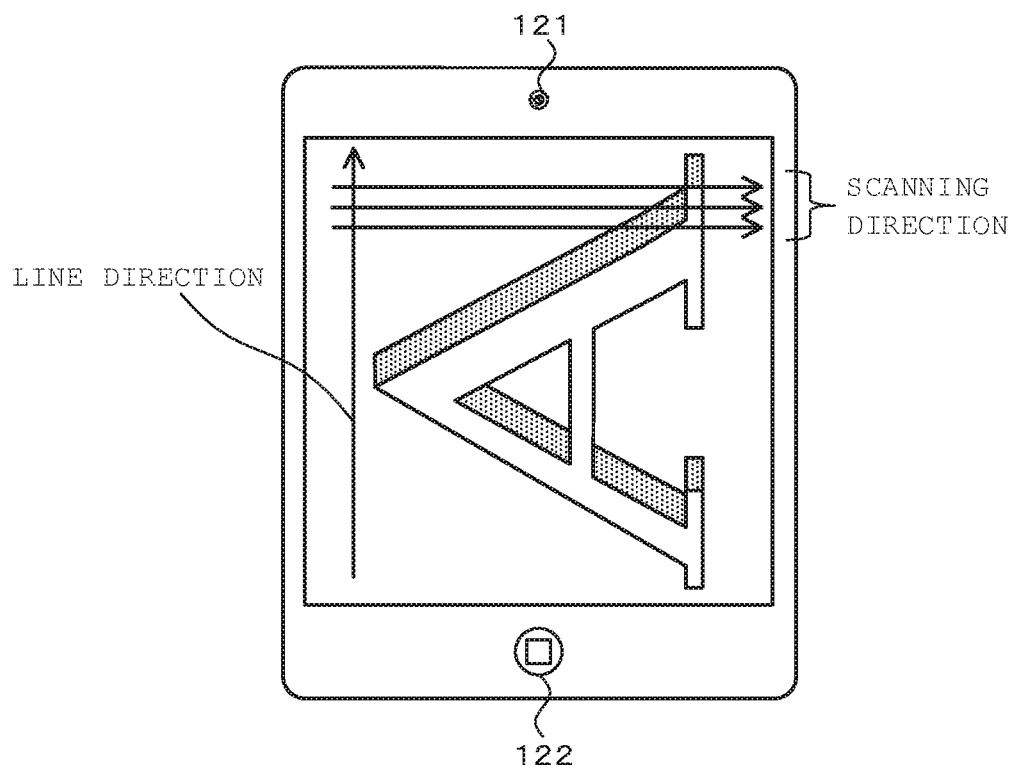
FIG. 18B illustrates a left rotation image displayed on the image display unit that is in the normal state.
Figure 19:
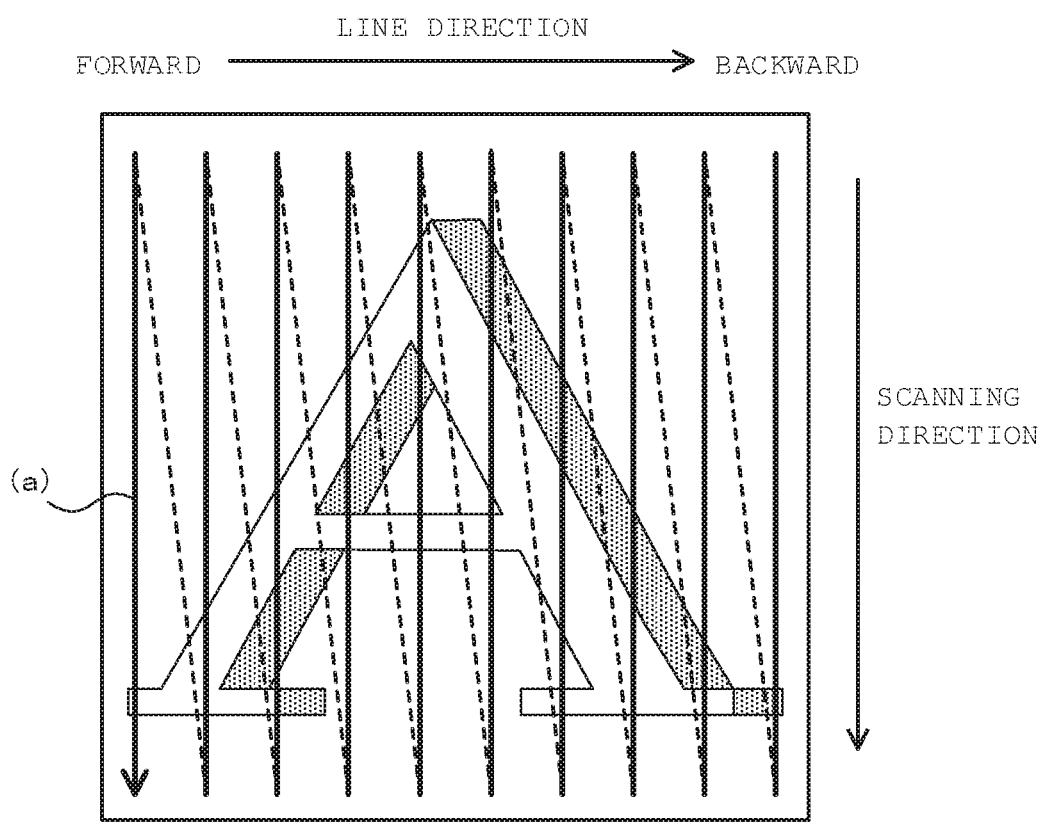
FIG. 19 is an explanatory view of reverse vertical raster output.

When the image display apparatus 100 outputs the left rotation image, the scanning direction of the display unit 110 does not match the line direction of the display image, as illustrated in FIG. 18B. To output the video signal along the scanning direction, the output image generating unit 150 needs to vertically output the video signal forward from the rear of the line (which is also called the "reverse vertical raster output"), as illustrated by an arrow (a) in FIG. 19. The output image generating unit 150, therefore, vertically reads the compressed block forward from the rear of the line, as illustrated by an arrow (a) in FIG. 20. The vertical reading is to read the pixel data from the buffer in a direction perpendicular to the line direction.

Figure 21:
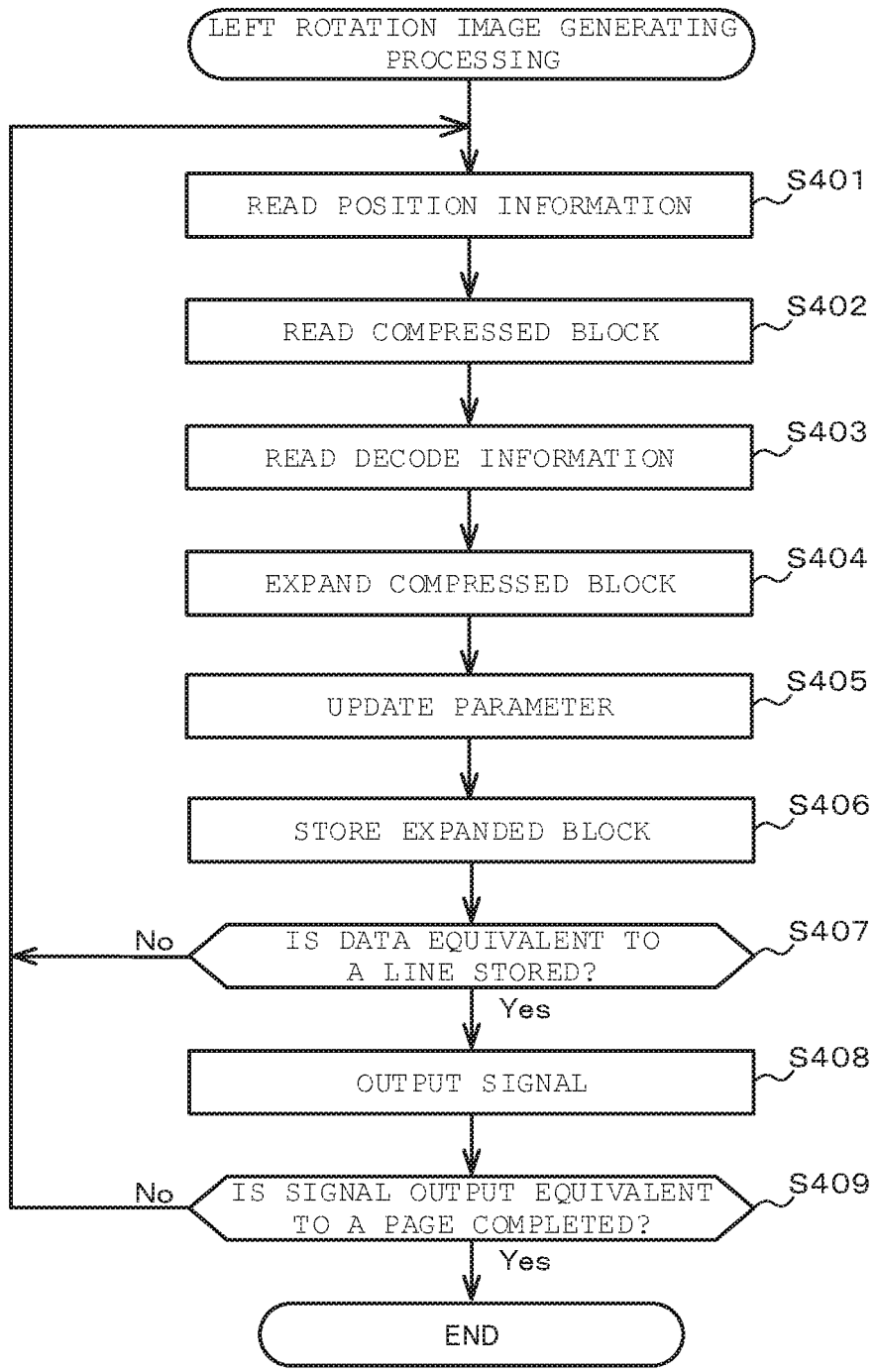
FIG. 21 is a flowchart of a left rotation image output processing.

When the compression processing in S101 is the forward reference compression, the output image generating unit 150 may instruct re-compression of the input image to the encoding unit 151 before executing the left rotation image output processing. The encoding unit 151 may compress the input image by the backward reference compression. When the compression processing at S101 is the backward reference compression or the non-reference compression, the output image generating unit 150 performs the left rotation image output processing without instructing re-compression. The left rotation image output processing will be described below by referring to the flowchart of FIG. 21.

The reading unit 152 reads the position information 162a from the parameter buffer 162 (S401). The address information stored in the position information 162a is, for example, the leading address of the next compressed block to be expanded in the line. If the decoding unit 153 has already completed the expansion of the compressed block C0(3) illustrated in FIG. 20, the address information 0 is the start address (i.e., (Adr0, Region Number 6)) of the compressed block C0(2).

Figure 20:
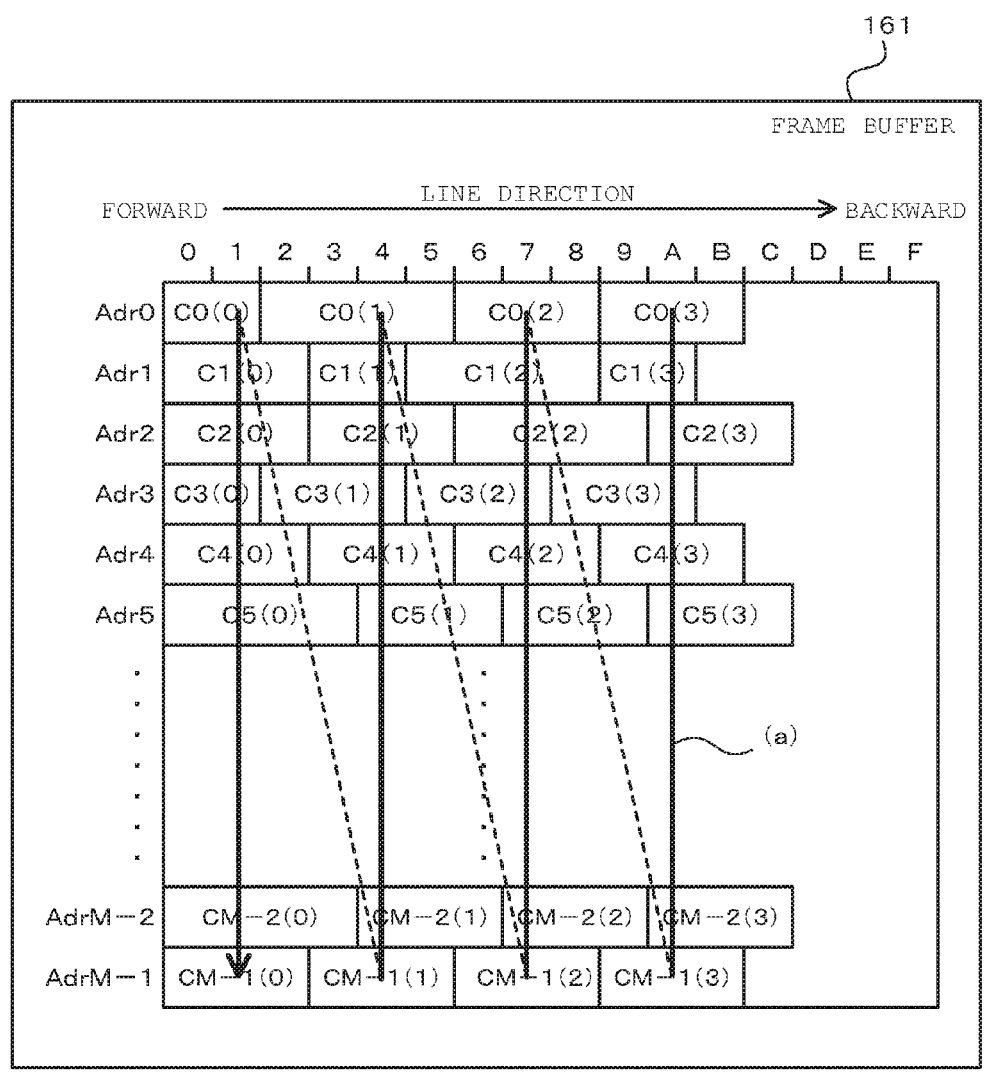
FIG. 20 illustrates reading order to read the compressed blocks in the case of left rotation image output processing.

The reading unit 152 selects the address information so as to read along the arrow (a) illustrated in FIG. 20. First, the reading unit 152 reads the address information 0. The reading unit 152 then reads the address information 1. When the reading of the address information M−1 is completed, the reading unit 152 reads the address information 0 again.

Subsequently, the reading unit 152 reads the compressed block from the frame buffer 161 according to the address information having been read (S402). For example, if the address information is ("Adr0, Region Number 6"), the reading unit 152 may read blocks starting from the block C0(2) from the frame buffer 161.

The reading unit 152 then reads the decode information 162b from the parameter buffer 162 (S403). In the case of the left rotation image output processing, the local decode information is the decode information of the next compressed block to be expanded in the same line. For example, if the decoding unit 153 has already completed the expansion of the compressed block C0(3), the local decode information 0 may be the decode information of the compressed block C0(2).

The reading unit 152 reads the global decode information and the local decode information of the compressed block having been read from the decode information 162b. The decoding unit 153 expands the compressed block using the decode information (S404).

Next, the information acquiring unit 154 updates the position information 162a and the decode information 162b stored in the parameter buffer 162 (S405). More specifically, the information acquiring unit 154 determines the start address of the next compressed block to be expanded in the same line according to the forward block information added to the compressed block. The information acquiring unit 154 updates the address information of the current line to be expanded.

In the present embodiment, the information acquiring unit 154 identifies a compressed block located one place ahead of and in the same line as the compressed block to be expanded (hereinafter referred to as a previous compressed block) as the next compressed block to be expanded. For example, if the compressed block C0(2) is to be expanded, the information acquiring unit 154 may rewrite the address information 0 as ("Adr0, Region Number 2").

The information acquiring unit 154 also extracts the local decode information used in expansion of the previous compressed block from the expanded block. For example, the information acquiring unit 154 may extract an average pixel value of the expanded block as the local decode information of the previous compressed block. The information acquiring unit 154 updates the decode information of the line to be expanded. For example, if the compressed block C0(2) is to be expanded, the information acquiring unit 154 may rewrite the local decode information 0.

Figure 22:
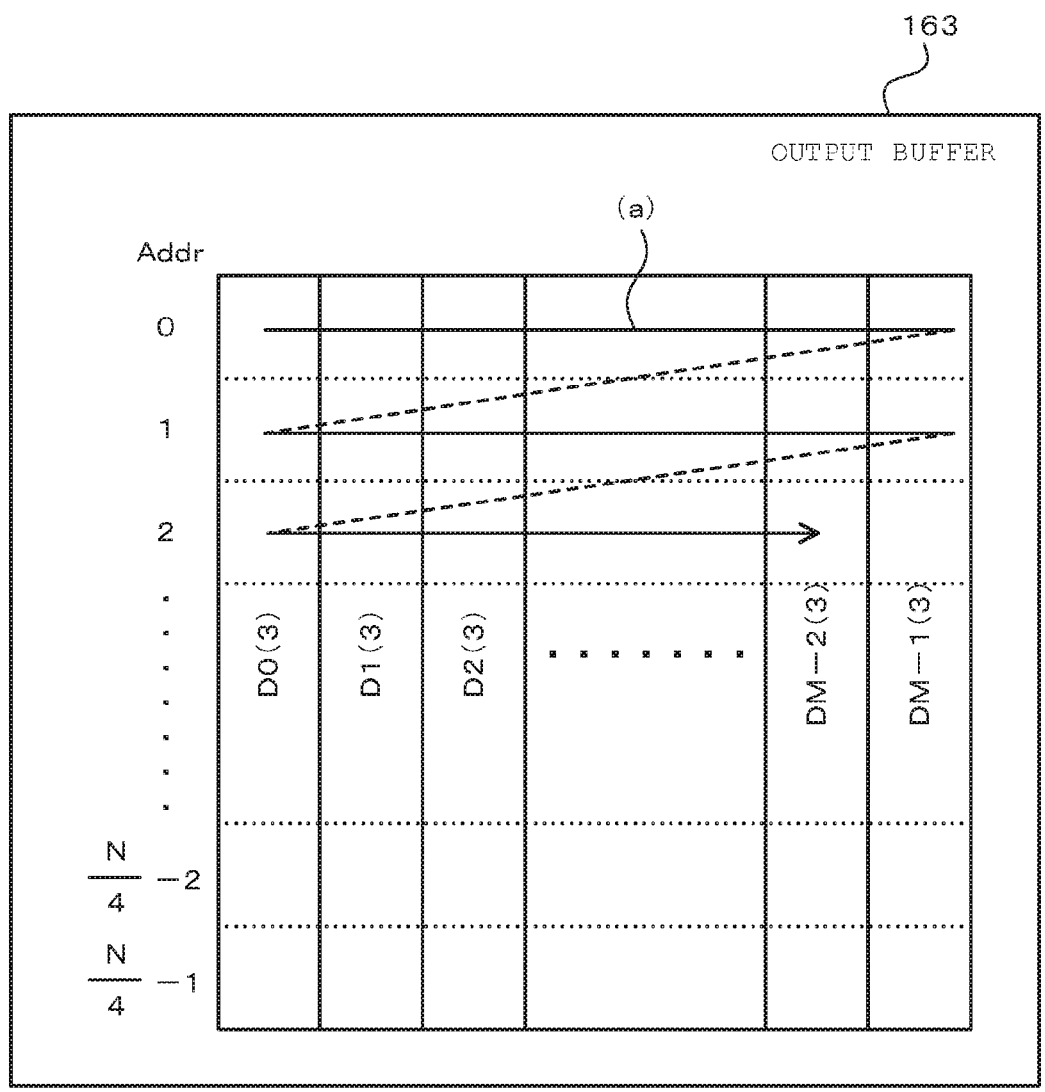
FIG. 22 illustrates the expanded blocks stored in the output buffer.

Next, the image rotating unit 155 stores the expanded blocks in the output buffer 163 (S406). FIG. 22 illustrates the output buffer 163 in which the expanded blocks are stored. The image rotating unit 155 successively writes the expanded blocks vertically to the output buffer 163.

Subsequently, the image output unit 156 determines whether the expanded blocks equivalent to one line have been stored in the output buffer 163. The image output unit 156 determines whether N expanded blocks (e.g., from D0(3) to DM−1 (3)) have been stored horizontally in a line in the output buffer 163 (S407). If the expanded blocks equivalent to one line have not been stored (No at S407), the process returns to S401.

If the expanded blocks equivalent to one line have been stored (Yes at S407), the image output unit 156 outputs the expanded blocks stored in the output buffer 163 to the display unit 110 in order of the addresses (i.e., along an arrow (a) illustrated in FIG. 22) (S408).

The output image generating unit 150 determines whether the output of the image equivalent to one page (i.e., equivalent to M lines) has been completed (S409). If the output is not completed yet (No at S409), the process returns to S401. If the output has been completed (Yes at S409), the output image generating unit 150 ends the left rotation image output processing.

Figure 23A:
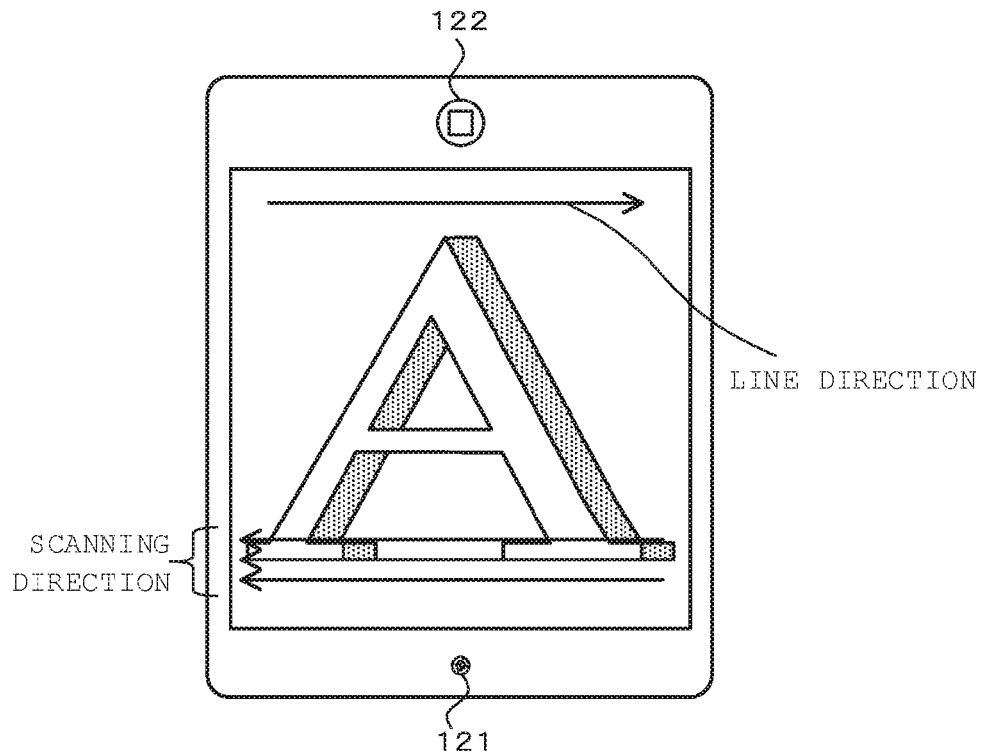
FIG. 23A illustrates a 180-degree rotation image displayed on the image processing apparatus that is in a 180-degree rotation state.

On the other hand, when the image display apparatus 100 is not in the right rotation state (No at S104), the output image generating unit 150 determines whether the image display apparatus 100 is in the 180-degree rotation state (S105). When the image display apparatus 100 is in the 180-degree rotation state (Yes at S104), the output image generating unit 150 starts the left rotation image output processing (S500). In the 180-degree rotation image output processing, the 180-degree rotation image is output on the display unit 110. The 180-degree rotation image is rotated by 180 degrees relative to a non-rotation image. FIG. 23A is an example of the 180-degree rotation image displayed on the image display apparatus 100 that is in the 180-degree rotation state. To facilitate understanding, the example of the 180-degree rotation image displayed on the image display apparatus 100 that is in the normal state is illustrated in FIG. 23B.

Figure 23B:
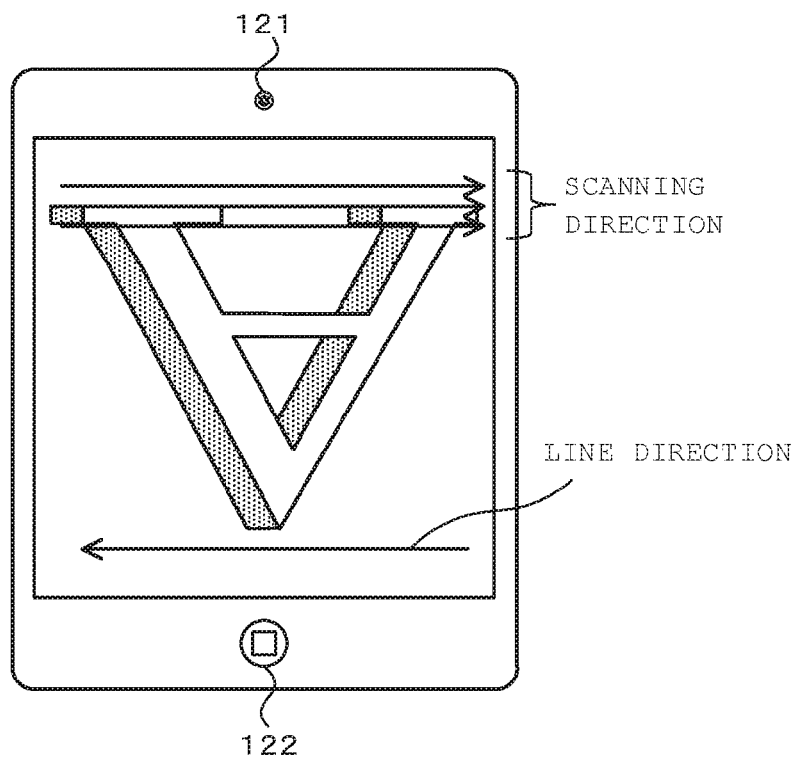
FIG. 23B illustrates a 180-degree rotation image displayed on the image processing apparatus that is in the normal state.
Figure 24:
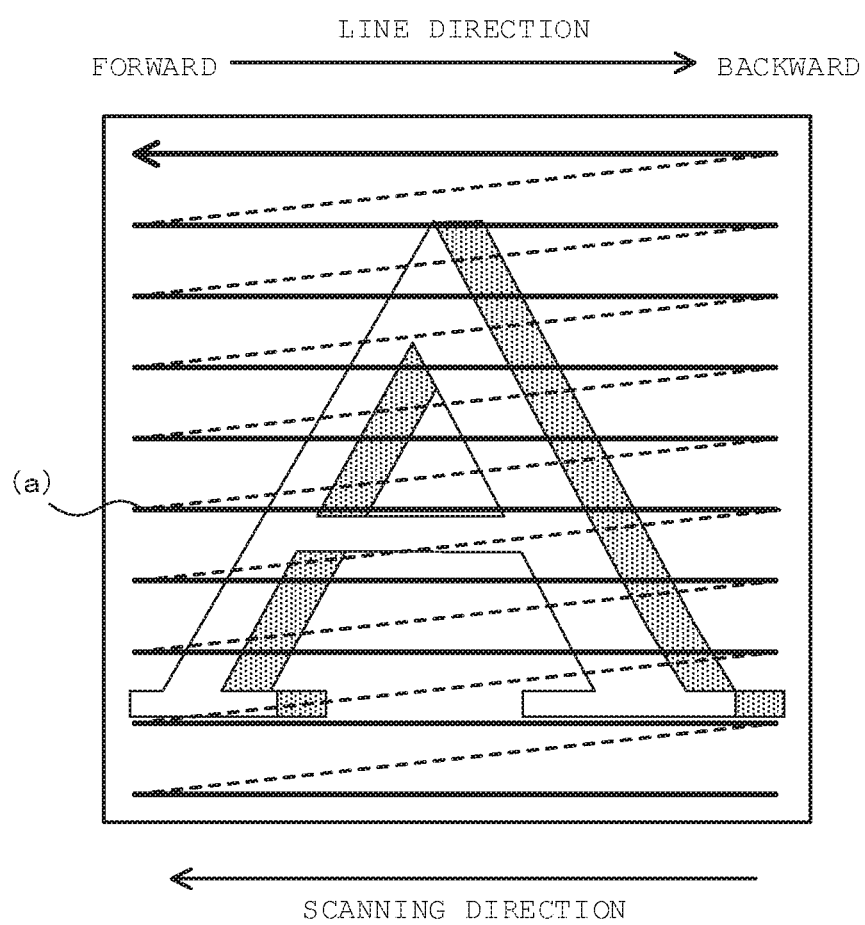
FIG. 24 is an explanatory view of reverse horizontal raster output.
Figure 25:
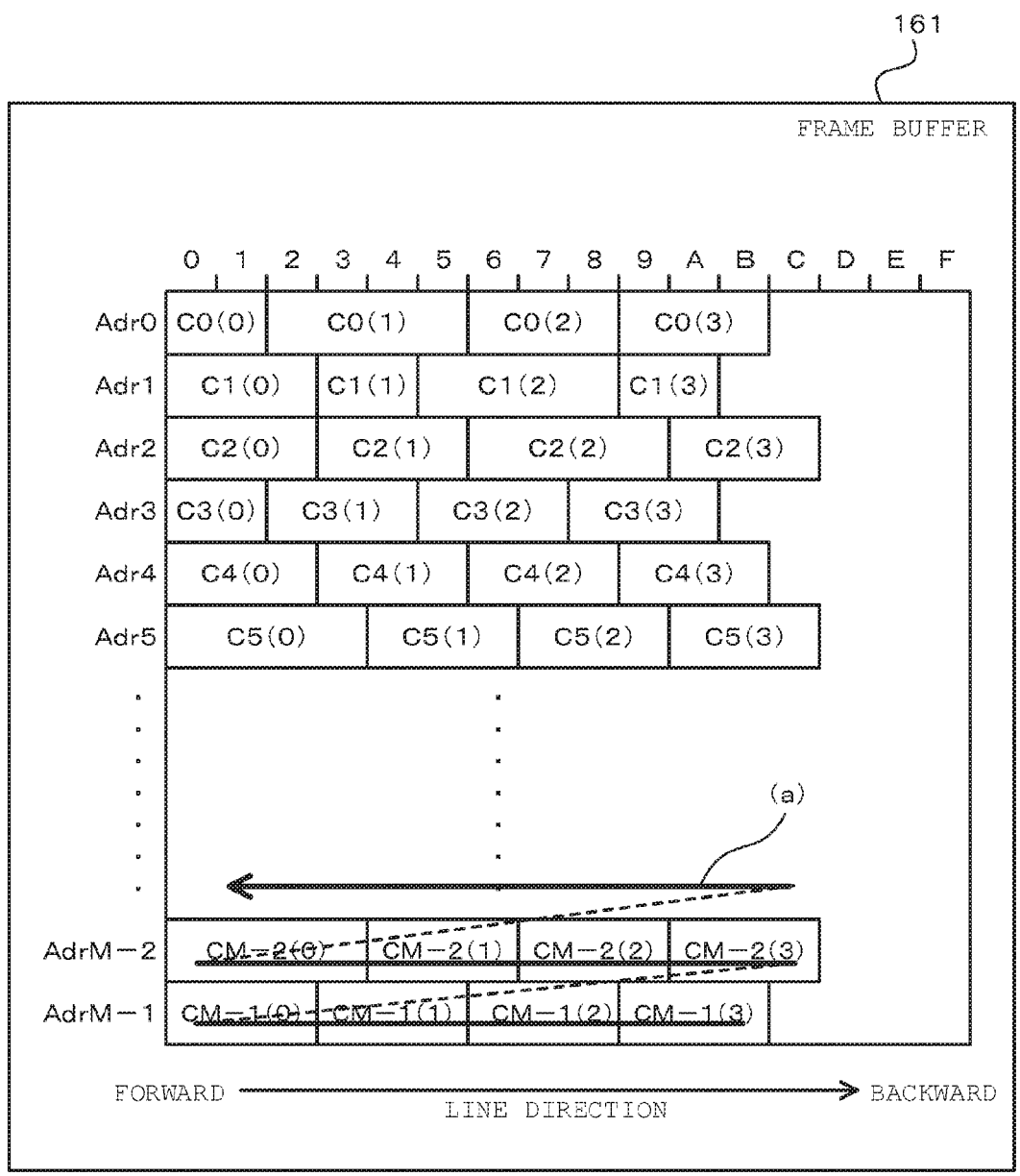
FIG. 25 illustrates reading order to read the compressed blocks in the case of output processing of a 180-degree rotation image.

When the image display apparatus 100 outputs the 180-degree rotation image, the scanning direction of the display unit 110 is opposite to the line direction of the display image, as illustrated in FIG. 23B. To output the video signal along the scanning direction, the output image generating unit 150 needs to successively output the video signal horizontally and forward from the rear of the line (which is also called the "reverse horizontal raster output"), as illustrated by an arrow (a) in FIG. 24. The output image generating unit 150, therefore, horizontally reads the compressed block forward from the rear of the line, as illustrated by an arrow (a) in FIG. 25. The horizontal reading is to read and take out pixel data from the buffer along the line direction.

Figure 26:
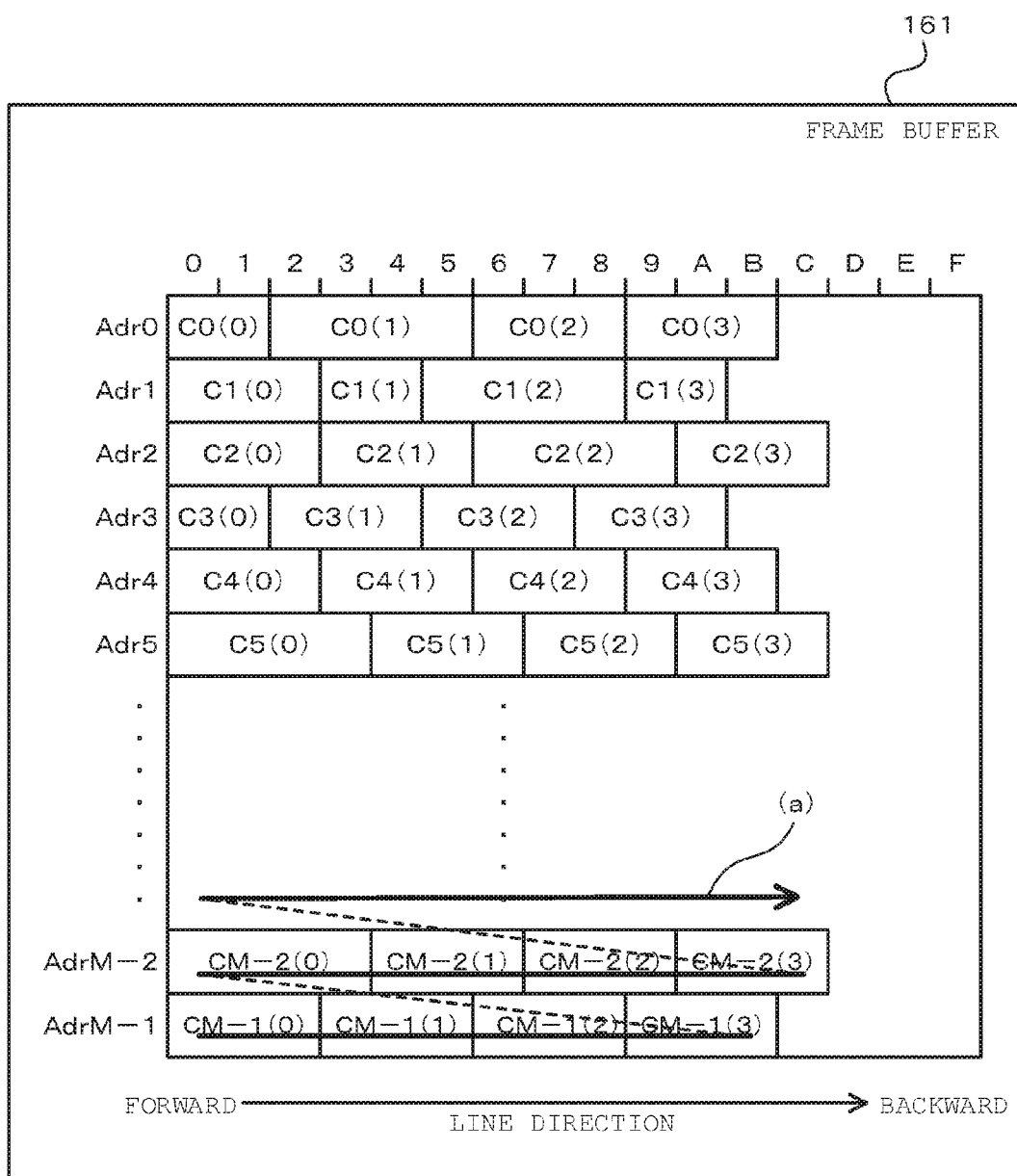
FIG. 26 illustrates reading order to read the compressed blocks in the case of the output processing of a 180-degree rotation image.

If the image display apparatus 100 outputs the 180-degree rotation image, the output image generating unit 150 may horizontally read the compressed block forward from the rear of the line, as illustrated by an arrow (a) in FIG. 26. The output image generating unit 150 may decode the compressed block in the same order as reading the compressed block. In this case, the image display apparatus 100 may include a separate buffer for one line, and the output image generating unit 150 stores the decoded image data equivalent to one line in the buffer for the one line. The output image generating unit 150 may read the pixel data in a reverse direction from the buffer for the one line, that is, in a forward direction from the rear of the line. This causes delay of the image display apparatus 100, but not decrease throughput.

Figure 27:
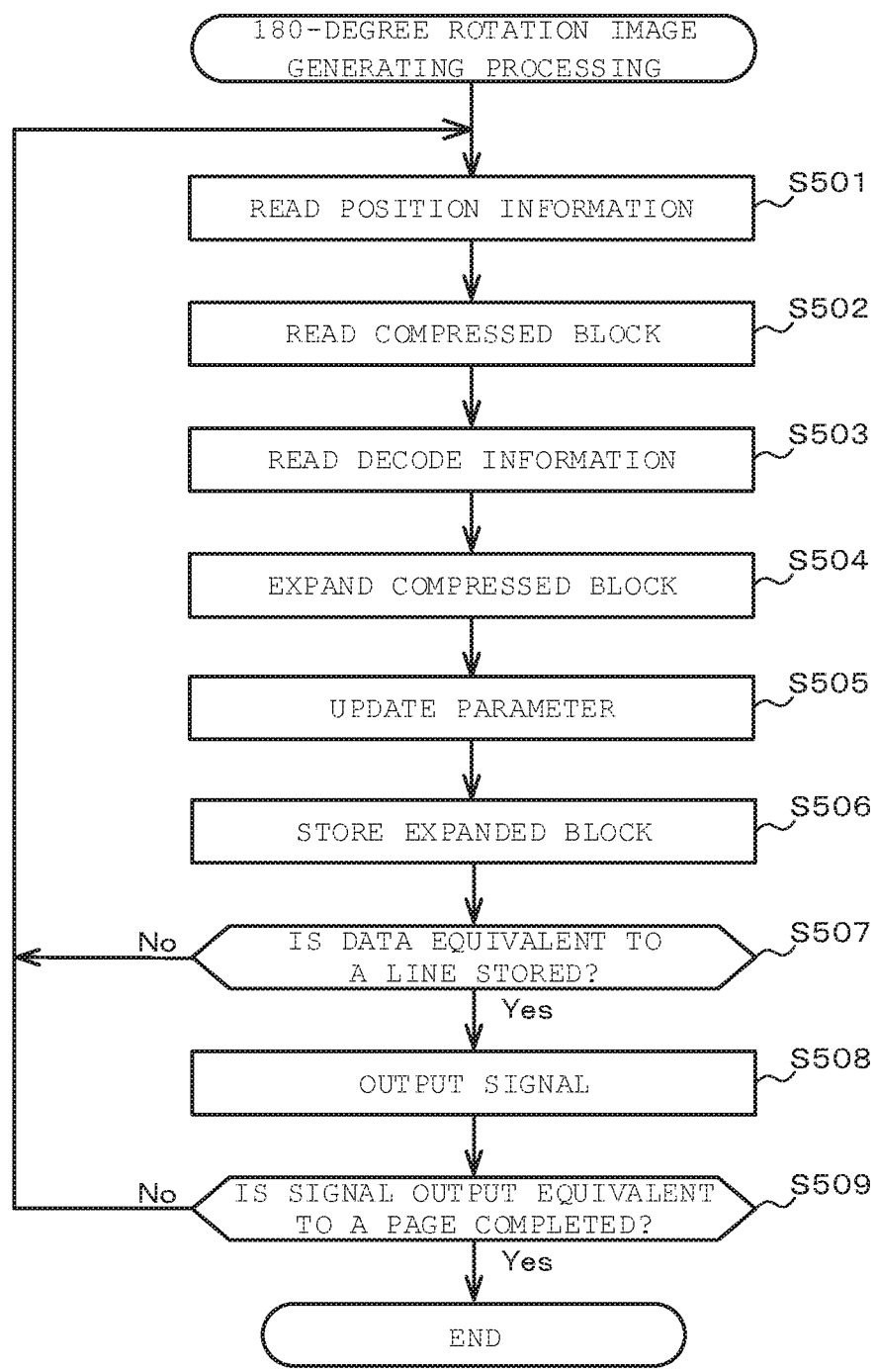
FIG. 27 is a flowchart of the output processing of the 180-degree rotation image.

When the compression processing in S101 is the forward reference compression, the output image generating unit 150 may instruct re-compression of the input image to the encoding unit 151 before executing the 180-degree rotation image output processing. At this time, the encoding unit 151 may compress the input image by the backward reference compression. When the compression processing in S101 is the backward reference compression or the non-reference compression, the output image generating unit 150 executes the 180-degree rotation image processing without instructing re-compression. The left rotation image output processing will be described below by referring to the flowchart of FIG. 27.

The reading unit 152 reads the position information 162a from the parameter buffer 162 (S501). The address information is, for example, the leading address of the next compressed block to be expanded in the line. If the decoding unit 153 has already completed the expansion of the compressed block CM–1(3), the address information M–1 is the start address of the compressed block CM–1 (2) (i.e., (AdrM–1, Region Number 6)). The reading unit 152 successively selects the address information forward from the rear of the line, as illustrated by the arrow (a) in FIG. 25.

Subsequently, the reading unit 152 reads the compressed block from the frame buffer 161 according to the address information having been read (S502). For example, if the address information is ("AdrM–1, Region Number 6"), the reading unit 152 may read the compressed block CM–1(2). The block size of the compressed block CM–1(2) is attached to the block CM–1(2) itself.

The reading unit 152 then reads the decode information 162b from the parameter buffer 162 (S503). In the case of the 180-degree rotation image output processing, the local decode information stored in the position information 162a is the decode information in the next compressed block to be expanded in the same line. For example, if the decoding unit 153 has already completed the expansion of the compressed block CM–1(3), the local decode information M–1 may be the decode information of the compressed block CM–1(2).

The reading unit 152 reads the global decode information and the local decode information of the compressed block having been read from the decode information 162b. The decoding unit 153 expands the compressed block using the decode information having been read (S504).

Next, the information acquiring unit 154 updates the position information 162a stored in the parameter buffer 162 and the decode information 162b (S505). More specifically, the information acquiring unit 154 determines the start address of the next compressed block to be expanded in the same line according to the forward block information added to the compressed block. The information acquiring unit 154 updates the address information of the current line to be expanded.

In the present embodiment, the information acquiring unit 154 identifies the compressed block located one place ahead of and in the same line as the compressed block to be expanded as the next compressed block to be expanded. For example, if the compressed block CM–1(2) is to be expanded, the information acquiring unit 154 may rewrite the address information M–1 as ("AdrM–1, Region Number 3").

The information acquiring unit 154 also extracts the local decode information used in expansion of the previous compressed block from the expanded block. For example, the information acquiring unit 154 may extract an average pixel value of the expanded block as the local decode information of the previous compressed block. The information acquiring unit 154 updates the decode information of the line to be expanded. For example, if the compressed block CM–1 (2) is to be expanded, the information acquiring unit 154 may rewrite the local decode information M–1.

Figure 28:
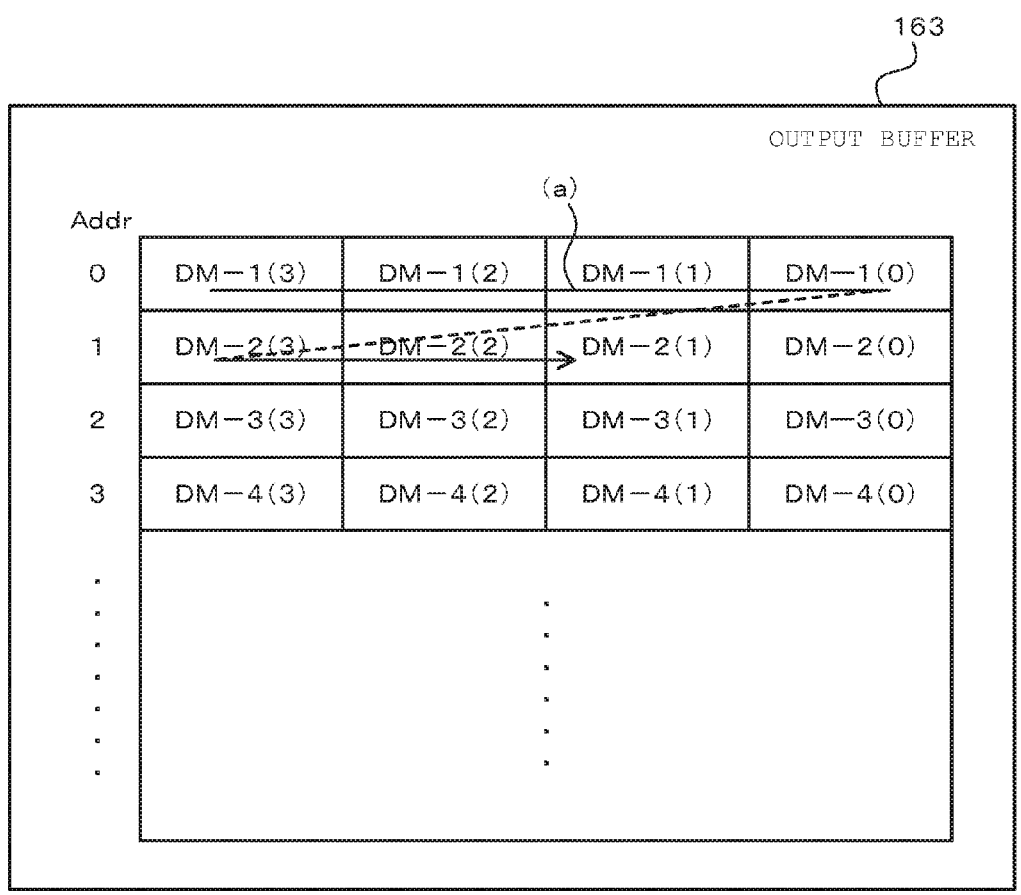
FIG. 28 illustrates the expanded blocks stored in the output buffer.

Next, the image rotating unit 155 stores the expanded blocks in the output buffer 163 (S506). FIG. 28 illustrates the output buffer 163 in which the expanded blocks have been stored. Subsequently, the image output unit 156 determines whether the expanded blocks equivalent to one line have been stored in the output buffer 163. The image output unit 156 determines whether four expanded blocks (e.g., from DM–1 (3) to DM–1 (0)) have been stored horizontally in a line in the output buffer 163 (S507). If the expanded blocks equivalent to one line have not been stored (No at S507), the process returns to S501.

If the expanded blocks equivalent to one line have been stored in the output buffer 163 (Yes at S507), the image output unit 156 outputs the expanded blocks stored in the output buffer 163 in order of the addresses (i.e., along an arrow (a) illustrated in FIG. 28) (S508) to the display unit 110.

The output image generating unit 150 determines whether the output of the image equivalent to one page (i.e., equivalent to M lines) has been completed (S509). If the output is not completed yet (No at S509), the process returns to S501. If the output has been completed (Yes at S509), the output image generating unit 150 ends the 180-degree rotation image output processing.

The output image generating unit 150 determines whether the input image generating unit 140 has been recovered from the stop state (S105). If the input image generating unit 140 is not recovered yet from the stop state (No at S105), the process returns to S102. If recovered (Yes at S105), the output image generating unit 150 ends the image output processing.

According to the present embodiment, the image display apparatus 100 compresses the input image to generate the compressed blocks, and stores the generated compressed blocks in the frame buffer 161. Each compressed block is formed by compressing pixel blocks, with each block being smaller than a line. The image display apparatus 100 can take out the compressed image from the frame buffer 161 for a size smaller than a line. In the present embodiment, therefore, it is not necessary to once expand all lines of the compressed image to display the rotated image. Specifically, the image display apparatus 100 does not have to specially secure the capacity of the buffer to output the rotated image. The output of the rotated image, therefore, can be realized with the frame buffer of a small capacity.

A compression efficiency of the image becomes lower as the size of a unit (block) to guarantee the compression becomes smaller. However, the compression efficiency is not largely decreased in the present embodiment, because the image display apparatus 100 of the present embodiment guarantees the compression for each line. In addition, the compressed line includes a plurality of compressed blocks. The image display apparatus 100 holds the expansion progress information (the position information and the decode information) in the parameter buffer 162, in order to allow expansion for each compressed block. The image display apparatus 100 can thus expand the input image and the frame buffer 161 for a size smaller than one line.

In the above embodiment, the encoding unit 151 attaches the additional information to the compressed blocks when storing the compressed blocks in the frame buffer 161. The encoding unit 151 may not attach the additional information to the compressed blocks when storing the compressed blocks in the frame buffer 161. In this case, the output image generating unit 150 may instruct re-compression of the input image to the encoding unit 151 before executing the left rotation image output processing in S400. Then the output image generating unit 150 may execute the processing similar to the right rotation image output processing in S300 on the re-compressed image. Similarly, the output image generating unit 150 may instruct re-compression of the input image to the encoding unit 151 before executing the 180-degree rotation image output processing in S500. The output image generating unit 150 may execute the processing similar to the non-rotation image output processing in S200 on the re-compressed image. As a result, the compression efficiency is improved, because the expansion of the image can be performed without attaching the additional information to each block.

Second Embodiment

Similar to the image display apparatus 100 of the first embodiment illustrated in FIG. 1, an image display apparatus 100 according to a second embodiment also includes a display unit 110, an input unit 120, a control unit 130, an input image generating unit 140, an output image generating unit 150, and a storage unit 160.

Figure 29:
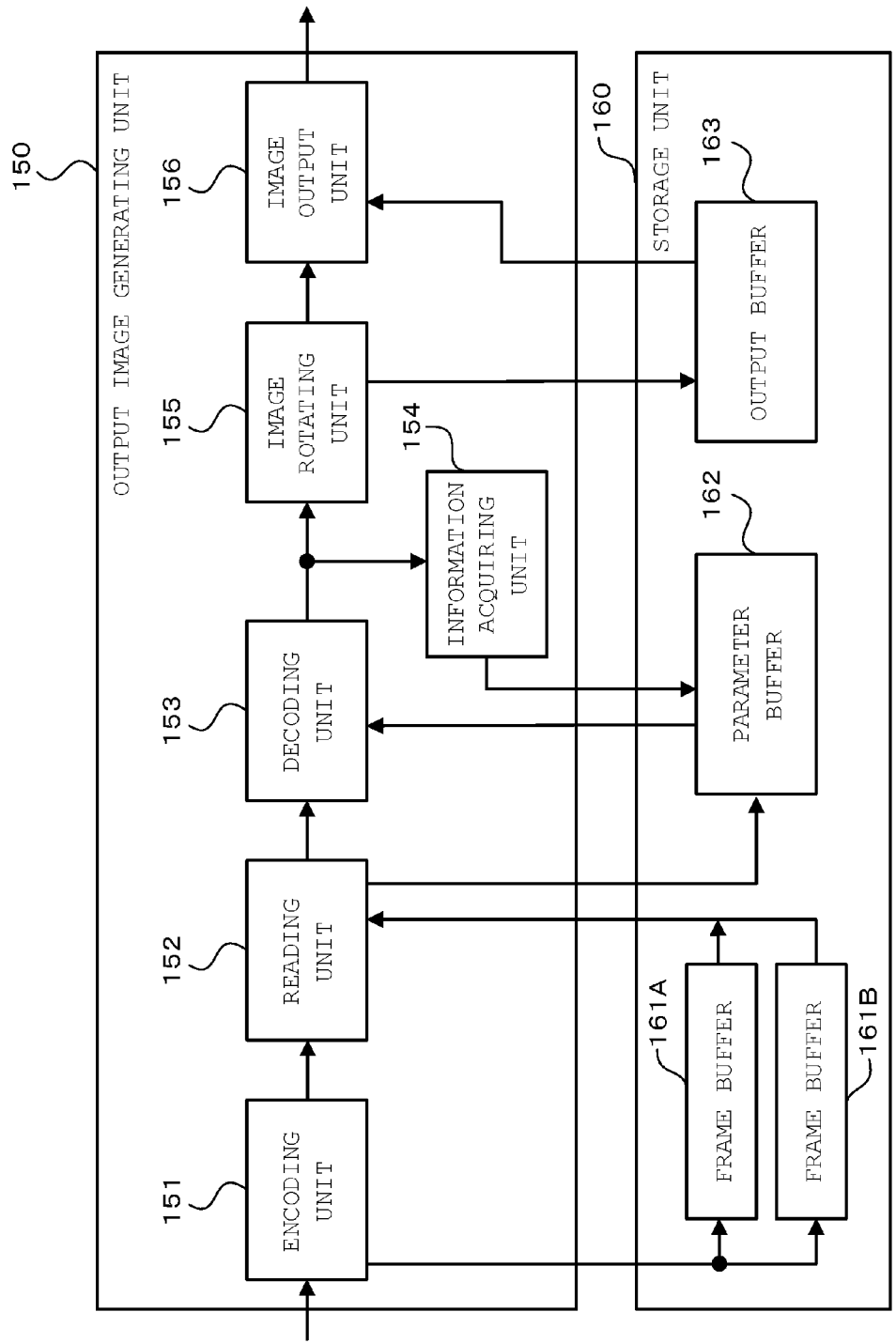
FIG. 29 is a block diagram illustrating an output image generating unit and a storage unit of an image display apparatus according to a second embodiment.

FIG. 29 is a block diagram illustrating the output image generating unit 150 and the storage unit 160. The storage unit 160 is a storage apparatus capable of reading/writing of data, such as the DRAM, the SRAM, the semiconductor memory, or the hard disc. The storage unit 160 includes a frame buffer 161*a*, a frame buffer 161*b*, a parameter buffer 162, a parameter buffer 162, and an output buffer 163.

The frame buffers 161*a*, 161*b* temporarily hold the compressed image formed by compressing the input image. The frame buffers 161*a*, 161*b* can independently read/write data.

The encoding unit 151 switches the place where the compressed block is stored to the other frame buffer each time a new input image is compressed. For example, the encoding unit 151 may store the compressed image in the frame buffer 161*a* when the image is input from the input image generating unit 140. After that, when a new image is input from the input image generating unit 140, the encoding unit 151 stores the compressed image in the frame buffer 161*b*. Next time the image is input from the input image generating unit 140, the encoding unit 151 stores the compressed image in the frame buffer 161*a* again.

A reading unit 152, a decoding unit 153, an information acquiring unit 154, an image rotating unit 155, and an image output unit 156 can operate in parallel with the encoding unit 151. The reading unit 152, the decoding unit 153, the information acquiring unit 154, the image rotating unit 155, and the image output unit 156 expand the compressed image stored in one frame buffer and output the expanded image to the display unit 110 while the encoding unit 151 compresses the input image and stores the compressed image in the other frame buffer. For example, if the encoding unit 151 stores the compressed image in the frame buffer 161*a*, the decoding unit 153, the information acquiring unit 154, the image rotating unit 155, and the image output unit 156 expand the compressed image stored in the frame buffer 161*b* and output the expanded image to the display unit 110.

Other parts of the structure of the image display apparatus 100 are similar to those of the image display apparatus 100 of the first embodiment, and the description thereof will not be repeated.

According to the present embodiment, the image display apparatus 100 includes a plurality of frame memories. The encoding unit 151 switches the place where the compressed block is stored to the other frame buffer each time a new input image is compressed. The reading unit 152, the decoding unit 153, the information acquiring unit 154, the image rotating unit 155, and the image output unit 156 expand the compressed image stored in one frame buffer and output the expanded image to the display unit 110 while the encoding unit 151 compresses the input image and stores the compressed image in the other frame buffer. As a result, the image display apparatus 100 can decrease the delay between the input of the image to the output image generating unit 150 and the output of the image to the display unit 110.

The embodiments described above are provided as merely examples, and various modifications and variations are possible. For example, in the above embodiments, the input image generating unit 140 inputs the non-compressed image in the output image generating unit 150. Alternatively, the input image generating unit 140 may input the compressed image in the output image generating unit 150. At this time, the encoding unit 151 may expand the input image and re-compress the expanded image, or may store the compressed image as it is obtained from the input image generating unit 140 in the frame buffer.

In the above embodiments, the encoding unit 151 compresses the pixel block using an irreversible compression system that may cause deterioration of the image. However, the compression system to compress the pixel block is not limited to such an irreversible compression system. The encoding unit 151 may compress the pixel block using a reversible compression system that may not cause deterioration of the image.

In the above embodiments, the additional information to be attached to the compressed blocks has been described as including the data size and the forward block information. Alternatively, the additional information may include the data size alone. The additional information may also include information in addition to or other than the data size and the forward block information.

When the additional information includes the data size alone, the additional information may be attached to the tail of the compressed block, as illustrated in FIG. 8B. In the left rotation image output processing and the 180-degree rotation image output processing, the information acquiring unit 154 may identify the leading address of the previous compressed block according to the additional information (data size) attached to the tail of the previous compressed block. In this case, the information acquiring unit 154 may record, as the address information of the position information 162a, the leading address of the current compressed block, instead of the leading address of the previous compressed block.

Further, in the above embodiments, one line of the input image has been described as including four pixel blocks. Alternatively, the one line of the input image may include at least four pixel blocks or four or smaller pixel blocks.

In the above embodiments, the forward direction has been described as going from the left to the right. Alternatively, the forward direction may go from the right to the left depending on the design of the apparatus.

The number of pixels that the output image generating unit 150 decodes at a time may not be provided for each compressed block. For example, the output image generating unit 150 may discontinue the expanding processing of Cm(0) after having expanded one pixel alone in Cm(0), and proceed to expansion of the compressed block in the next line (Cm−1 (0) or Cm+1 (0)). At this time, the output image generating unit 150 stores information used in decoding Cm(0) (e.g., a reading address, the local decode pixel, the quantization coefficient, information of K in Golomb-Rice coding, etc.) in the parameter buffer 162 as the local decode information. The output image generating unit 150 then reads the local decode information from the parameter buffer 162 next time the output image generating unit 150 decodes Cm(0), and restarts expansion of a second pixel in Cm(0).

The image display apparatus 100 according to the embodiments has been described as a tablet terminal. Alternatively, the image display apparatus 100 may be an apparatus other than the tablet terminal, such as a TV, a recorder, a personal computer, a fixed phone, a mobile phone, a smartphone, a personal digital assistant (PDA), or a game machine. The image display apparatus 100 may not include the display unit 110. In the above embodiments, the image display apparatus 100 has been illustrated as an example of the image processing apparatus of the present embodiment. Alternatively, the image processing apparatus may be an apparatus that does not include the display unit. For example, the image processing apparatus may be a part mounted on the image display apparatus 100. For example, the image processing apparatus may be a semiconductor chip that forms the control unit 130 of the image display apparatus 100, or a semiconductor substrate on which the semiconductor chip is mounted.

The image display apparatus 100 according to the present embodiment may be realized by a dedicated computer system or by a normal computer system. For example, the image display apparatus 100 may be formed in such a manner that the program used to execute the above operations is stored in and distributed as a readable recording medium, such as an optical disc, semiconductor memory, a magnetic tape, or a flexible disc, and such a program is installed on the computer to execute the above processing. The above program may be stored in a disc apparatus included in a server apparatus on a network such as the Internet, and downloaded, etc. on the computer. The above-described function may be realized in cooperation with an operating system (OS) and application software. In this case, the components other than the OS may be stored in and distributed as a medium or stored in a server apparatus to allow download, etc. on the computer.

The embodiments according to the present invention have been described above, but the embodiments are demonstrated by way of example and do not intend to limit the scope of the invention. The novel embodiments may be accomplished in various forms and may be variously omitted, replaced and changed without departing from the scope of the invention. The embodiments and their variants are encompassed in the scope or spirit of the invention, and are encompassed in the invention described in Claims and the range of its equivalents.

What is claimed is:

1. An image processing apparatus comprising:
an encoder configured to compress an input image for each pixel block having a size smaller than a line to generate a plurality of compressed blocks, and store the compressed blocks in a frame buffer;
a reader configured to identify an object block to be expanded among the compressed blocks, and read the object block from the frame buffer;
a decoder configured to expand the object block to generate an expanded block; and
an information acquirer configured to acquire, based on the expanded block, position information used by the reader to identify the block to be expanded, or decode information used by the decoder to expand another compressed block.

2. The image processing apparatus according to claim 1, wherein
the information acquirer acquires the decoded information based on the expanded block, and
the decoder expands the compressed block using the decoded information.

3. The image processing apparatus according to claim 2, wherein
the encoder compresses the input image for each line to convert the input image into a plurality of compressed lines, each line including the compressed blocks, and store the compressed lines in the frame buffer.

4. The image processing apparatus according to claim 3, wherein
the information acquirer acquires, based on each of the expanded block generated by the decoder, the decoded information used in expanding another compressed block located in the same compressed line as the identified block, and stores the decoded information in a storage by sorting the decoded information by line, and
the decoder expands the compressed block using the decoded information stored in the storage.

5. The image processing apparatus according to claim 4, wherein
the decoded information includes local decoded information, and
the decoder expands the compressed block using the local decoded information.

6. The image processing apparatus according to claim 5, wherein the information acquirer acquires the position information based on each of the expanded block generated by the decoding, and stores the position information in the storage by sorting the position information by line, and the reader identifies a position of the object block using the position information.

7. The image processing apparatus according to claim 6, wherein the position information includes address information to identify a position of a subsequent compressed block following the expanded block generated by the decoder, and the reader identifies the position of the subsequent compressed block using the address information.

8. The image processing apparatus according to claim 2, further comprising:

an image outputter configured to output a rotated image obtained by rotating the input image based on the expanded block.

9. The image processing apparatus according to claim 8, wherein the reader successively reads the compressed blocks vertically and forward from the rear of the line from the frame buffer, when the image outputter outputs a right rotation image obtained by rotating the input image by 90 degrees to the right.

10. The image processing apparatus according to claim 1, wherein the information acquirer acquires the position information based on the expanded block, and the reader identifies the object block to be expanded using the position information.

11. The image processing apparatus according to claim 10, wherein the information acquirer acquires the position information based on each of the expanded block generated by the decoder, and stores the acquired position information in the storage by sorting the position information by line, and the reader identifies the position of the object block to be expanded using the position information.

12. The image processing apparatus according to claim 11, wherein the encoder adds to the compressed block generated, block position information of a previous compressed block in the same line, the information acquirer acquires the block position information from the object block when the decoder expands the object block, and stores the block position information of the previous compressed block in the storage by sorting the block position information by line, and the reader identifies a position of the previous compressed block using the block position information.

13. The image processing apparatus according to claim 12, wherein the encoder compresses the input image for each line to convert the input image into a plurality of compressed lines, each line including the compressed blocks, and stores the compressed lines in the frame buffer.

14. The image processing apparatus according to claim 13, wherein the information acquirer acquires the decoded information used in expanding the previous compressed block located ahead of the compressed block in the same line based on each of the expanded block generated by the decoder, stores the local decoded information in the storage by sorting the local decoded information by line, and the decoder expands the previous compressed block using the local decoded information.

15. The image processing apparatus according to claim 10, further comprising:

an image outputter configured to output a rotated image obtained by rotating the input image based on the expanded block.

16. The image processing apparatus according to claim 15, wherein the reader successively reads the compressed blocks vertically and forward from the rear of the line from the frame buffer, when the image outputter outputs a left rotation image obtained by rotating the input image by 90 degrees to the left.

17. The image processing apparatus according to claim 15, wherein the reader successively reads the compressed blocks horizontally and forward from the rear of the line from the frame buffer, when the image outputter outputs a 180-degree rotation image obtained by rotating the input image by 180 degrees.

18. The image processing apparatus according to claim 1, wherein the frame buffer includes a plurality of memories, each memory being able to operate independently among the memories, and data being read/written from and to each memory, the encoder switches a storage place where the compressed image is stored to another memory among the memories each time the input image is newly compressed, and the reader, the decoder, and the information acquirer are operable in parallel with the encoder, and read the compressed block from another memory among the memories while the encoder compresses the input image and stores the compressed image in one memory.

19. The image processing apparatus according to claim 1, further comprising:

an input image generator configured to generate the input image; and an output controller configured to stop the operation of the input image generating unit after the input image is input to the encoder, while the encoder, the reader, the decoder, and the information acquirer generate an output image to be output to a display.

20. An image processing method comprising:

generating a plurality of compressed blocks by compressing an input image for each pixel block having a size smaller than a line, and storing the generated compressed blocks in a frame buffer;

identifying a object block to be expanded among the compressed blocks, and reading the object compressed block from the frame buffer;

expanding the object block to generate an expanded block; and acquiring, based on the expanded block, position information to identify the object block or decode information to expand another compressed block.

* * * * *